United States Patent
Okamura

(10) Patent No.: US 7,583,753 B2
(45) Date of Patent: Sep. 1, 2009

(54) METHODS AND TRANSMITTERS FOR LOOP-BACK ADAPTIVE PRE-EMPHASIS DATA TRANSMISSION

(75) Inventor: Hitoshi Okamura, Gyeonggi (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 667 days.

(21) Appl. No.: 11/204,077

(22) Filed: Aug. 15, 2005

(65) Prior Publication Data

US 2006/0034358 A1 Feb. 16, 2006

(30) Foreign Application Priority Data

Aug. 16, 2004 (KR) .................... 10-2004-0064460

(51) Int. Cl.
*H04K 1/02* (2006.01)

(52) U.S. Cl. .................... 375/296; 326/22; 326/83; 327/112; 398/27; 398/41; 398/94; 398/193; 375/226; 375/229; 375/316; 375/358; 375/340

(58) Field of Classification Search .................... 375/296
See application file for complete search history.

(56) References Cited

U.S. PATENT DOCUMENTS

| 6,212,229 | B1 | 4/2001 | Salinger | 375/224 |
| 6,265,920 | B1 | 7/2001 | Gauthier | 327/166 |
| 7,116,944 | B2 * | 10/2006 | Das et al. | 455/69 |
| 7,423,454 | B2 * | 9/2008 | Stojanovic et al. | 326/83 |
| 7,440,530 | B1 * | 10/2008 | Ballantyne | 375/358 |
| 7,447,260 | B2 * | 11/2008 | Takahashi | 375/229 |

FOREIGN PATENT DOCUMENTS

| JP | 10-294630 | 11/1998 |
| KR | 1995-0031641 | 12/1995 |

* cited by examiner

*Primary Examiner*—Shuwang Liu
*Assistant Examiner*—Dhaval Patel
(74) *Attorney, Agent, or Firm*—Myers Bigel Sibley & Sajovec, P.A.

(57) ABSTRACT

A method of transmitting data can include pre-emphasizing data for transmission by a transmitter over a transmission line based on an error feedback signal provided to the transmitter from a receiver of the pre-emphasized data.

20 Claims, 15 Drawing Sheets

FIG. 2

| PRE-EMPHASIS STRENGTH(n) | TEST | THE NUMBER OF BIT ERRORS |
|---|---|---|
| 0.1 | FAULT | 100 |
| 0.2 | FAULT | 60 |
| 0.3 | FAULT | 30 |
| 0.4 | PASS | 0 |
| 0.5 | PASS | 10 |
| 0.6 | FAULT | 80 |
| 0.7 | FAULT | 100 |
| 0.8 | FAULT | 120 |

FIG. 8

| PRE-EMPHASIS STRENGTH(n) | EYE SIZE |
|---|---|
| 0.1 | 0.1 |
| 0.2 | 0.2 |
| 0.3 | 0.4 |
| 0.4 | 0.3 |
| 0.5 | 0.3 |
| 0.6 | 0.2 |
| 0.7 | 0.1 |

METHODS AND TRANSMITTERS FOR LOOP-BACK ADAPTIVE PRE-EMPHASIS DATA TRANSMISSION

CLAIM FOR PRIORITY

This application claims priority to Korean Patent Application No. 2004-64460 filed on Aug. 16, 2004 in the Korean Intellectual Property Office (KIPO), the entire contents of which are hereby incorporated by reference.

FIELD OF THE INVENTION

The present invention relates to an adaptive pre-emphasis apparatus, a data communication transmitter, a data communication transceiver and an adaptive pre-emphasis method.

BACKGROUND

When data is transmitted at a high speed through a transmission line, such as a printed circuit wiring, inter-symbol interference (ISI) may occur due to the characteristics of the transmission line. Due to the ISI, an amplitude and a phase of a received signal may be distorted, and bit errors may occur in a signal at a receiver. Furthermore, as the length of the transmission line becomes longer and the transmission speed becomes faster, the amplitude and the phase of the received signal at the receiver may be significantly distorted.

In order to compensate for the distortion due to the ISI, the receiver can employ an adaptive decision feedback equalizer (DFE). The adaptive DFE compensates for a magnitude and a delay characteristic of the received signal in the receiver by updating a tap coefficient of the equalizer based on a channel characteristic. Additionally, in order to reduce the ISI of the signal at the receiver, the adaptive DFE can determine a pre-emphasis strength value based on the length of the transmission line and the data transmission speed, and pre-emphasizes a signal based on the determined pre-emphasis strength value to transmit the pre-emphasized signal.

In particular, a transmitter can pre-emphasize the data corresponding to a high frequency component to transmit the pre-emphasized data, since the high frequency component is more attenuated than a low frequency component when the high frequency component is transmitted through the transmission line. When the transmitter transmits data to the receiver, in order to compensate for the data signal, the data signal may be pre-emphasized based on an optimum pre-emphasis strength value.

A degree of attenuation of the high frequency component in the transmitted data signal is varied based on a length of the transmission line, such as a printed pattern formed on a printed circuit board (PCB). The optimum pre-emphasis strength value may be varied based on the transmission line length.

If the pre-emphasis strength value of the high frequency component of the transmitted data signal becomes excessively large, the size of a data eye pattern of the data signal received to the receiver may be decreased. A data communication system in which a transmitter and a receiver are used together has transmission conditions that can be variable, such as the transmission line length and the data transmission speed. Thus, some systems set a pre-emphasis strength value despite the variable transmission conditions.

It may be difficult to manually control the pre-emphasis strength value since the ISI increases when the data transmission speed becomes faster. When the conventional transmitter transmits a pre-emphasized data signal based on the pre-emphasis strength value that is manually set by a conventional pre-emphasis circuit in the conventional transmitter, the transmitter may not be able to verify whether the set pre-emphasis strength value is the optimum pre-emphasis strength value or not.

SUMMARY

Embodiments according to the invention can provide methods and transmitters for loop-back adaptive pre-emphasis data transmission. Pursuant to these embodiments, a method of transmitting data can include pre-emphasizing data for transmission by a transmitter over a transmission line based on an error feedback signal provided to the transmitter from a receiver of the pre-emphasized data.

In some embodiments according to the invention, the transmission line is a first transmission line coupled between the transmitter and the receiver and the method further includes receiving the error feedback signal at the transmitter over a second transmission line coupled between the transmitter and receiver.

In some embodiments according to the invention, the error feedback signal is an indication of a bit error rate associated with transmission of the data over the transmission line. In some embodiments according to the invention, the error feedback signal is an indication of a size of a data eye associated with the data received by the receiver. In some embodiments according to the invention, the error feedback signal is an indication of jitter associated with the data received by the receiver.

In some embodiments according to the invention, the error feedback signal is a looped back received data signal corresponding to the pre-emphasized data received by the receiver. The method can further include receiving the looped back received data signal at the transmitter and determining, at the transmitter, an indication of error in the looped back received data signal to provide the error feedback signal.

In some embodiments according to the invention, determining can further include comparing the looped back received data signal to a data pattern used to provide the transmitted pre-emphasized data. In some embodiments according to the invention, determining further includes determining a data eye size of the looped back received data signal. In some embodiments according to the invention, determining further includes determining jitter associated with the looped back received data signal.

In some embodiments according to the invention, determining jitter further includes time-shifting the looped back received data signal received by the transmitter over a time interval relative to a clock used by the receiver to receive the transmitted pre-emphasized data. In some embodiments according to the invention, pre-emphasizing data includes pre-emphasizing data based on an output of a pre-emphasis controller circuit in the transmitter.

In some embodiments according to the invention, pre-emphasizing data further includes providing a first output voltage based on an input voltage combined with a predetermined pre-emphasis strength value. A second output voltage is provided based on the input voltage. The first and second output voltages are combined to provide the pre-emphasizing data.

In some embodiments according to the invention, a method of transmitting data includes (a) initializing a transmitter including a pre-emphasis circuit; (b) pre-emphasizing data, using a predetermined pre-emphasis strength value, for transmission by the transmitter over a transmission line to a receiver of the pre-emphasized data; (c) receiving an error feedback signal provided to the transmitter from the receiver, the error feedback signal comprising an indication of an error in the pre-emphasized data; (d) recording the indication of the error associated with the predetermined pre-emphasis strength value used to pre-emphasize the data transmitted; (e) changing the predetermined pre-emphasis strength value to provide a next predetermined pre-emphasis strength value; (f) updating the predetermined pre-emphasis strength value with the next predetermined pre-emphasis strength value; (g) repeatedly performing actions (b) through (f) until pre-emphasized data has been transmitted using a maximum pre-emphasis strength value; (h) determining the pre-emphasis strength value associated with the minimum recorded indication of error to provide an operational pre-emphasis strength value; and (i) applying the operational pre-emphasis strength value to provide pre-emphasized data for transmission.

In some embodiments according to the invention, a transmitter includes a pre-emphasis circuit configured to provide pre-emphasized data for transmission over a transmission line based on an error feedback signal provided to the pre-emphasis circuit and a pre-emphasis controller circuit configured to provide the error feedback signal based on an indication of error in the transmission of the data over the transmission line provided by a receiver of the transmitted data.

In some embodiments according to the invention, the pre-emphasis controller circuit is further configured to provide predetermined pre-emphasis strength values from a memory to the pre-emphasis circuit to vary the pre-emphasized data based on the error feedback signal table. In some embodiments according to the invention, pre-emphasis controller circuit is further configured to use the predetermined pre-emphasis strength values from the memory during a pre-emphasis strength value search mode.

In some embodiments of the present invention, there is provided an adaptive pre-emphasis apparatus including: a pre-emphasis circuit configured to pre-emphasize a serial data stream based on a pre-emphasis control value to transmit the pre-emphasized serial data stream to a receiver via a first transmission line; and a pre-emphasis controller configured to receive measured values of transmission errors of the pre-emphasized serial data stream from the receiver via a second transmission line, and configured to set the pre-emphasis control value corresponding to a minimum measured value of the transmission errors, to an optimum pre-emphasis control value.

In other embodiments of the present invention, there is provided an adaptive pre-emphasis apparatus including: a pre-emphasis circuit configured to pre-emphasize first serial data stream based on a pre-emphasis control value to transmit the pre-emphasized first serial data stream to a receiver via a first transmission line; a transmission error measurer configured to measure a transmission error of a second serial data stream received through a second transmission line, the second serial data stream being generated by loop-backing the first serial data stream through the receiver; and a pre-emphasis controller configured to set the pre-emphasis control value corresponding to a minimum transmission error, to an optimum pre-emphasis.

In other embodiments of the present invention, there is provided a transmitter for data communication, the transmitter including: a pattern generator configured to generate parallel data stream composed of k bits, k being a natural number greater than 2; a serializer configured to convert the parallel data stream into a serial data stream; a pre-emphasis circuit configured to pre-emphasize the serial data stream based on a pre-emphasis control value, to transmit the pre-emphasized serial data stream to a receiver via a first transmission line; and a pre-emphasis controller configured to receive measured values of transmission errors of the pre-emphasized serial data stream from the receiver via a second transmission line, and configured to set the pre-emphasis control value corresponding to a minimum measured value of the transmission errors, to an optimum pre-emphasis control value.

In other embodiments of the present invention, there is provided a transmitter for data communication, the transmitter including: a pattern generator configured to generate first parallel data composed of k bits, k being a natural number greater than 2; a serializer configured to serialize the first parallel data to a first serial data stream; a pre-emphasis circuit configured to pre-emphasize the first serial data stream based on a pre-emphasis control value to transmit the first pre-emphasized serial data to a receiver via a first transmission line; a deserializer configured to deserialize second serial data stream received through a second transmission line, into second parallel data, the second serial data stream being generated by loop-backing the first serial data stream through the receiver; a transmission error measurer configured to measure transmission errors of the second parallel data; and a pre-emphasis controller configured to set the pre-emphasis control value corresponding to a minimum transmission error to an optimum pre-emphasis.

In other embodiments of the present invention, there is provided a transceiver for data communication, the transceiver including: a first transmission line; a transmitter configured to transmit a first serial data stream that is obtained by deserializing first parallel data composed of k bits via the first transmission line, k being a natural number greater than 2; a second transmission line; and a receiver configured to measure transmission errors of a second serial data stream received through the first transmission line to transmit the measured transmission errors to the transmitter via the second transmission line, and wherein the transmitter comprises: a pattern generator configured to generate the first parallel data; a serializer configured to serialize the first parallel data to the first serial data; a pre-emphasis circuit configured to pre-emphasize the first serial data stream based on a pre-emphasis control value to transmit the pre-emphasized serial data to the receiver via the first transmission line; and a pre-emphasis controller configured to receive the transmission errors of the pre-emphasized serial data stream from the receiver via the second transmission line, and configured to set the predetermined pre-emphasis control value corresponding to a minimum transmission error, to an optimum pre-emphasis control value.

In other embodiments of the present invention, there is provided a transceiver for data communication, the transceiver including: a first transmission line; a transmitter configured to transmit a first serial data stream that is obtained by deserializing first parallel data composed of k bits via the first transmission line, k being a natural number greater than 2; a second transmission line; and a receiver configured to loop-back the first serial data stream received from the transmitter via the first transmission line, to the transmitter via the second transmission line, and wherein the transmitter comprises: a pattern generator configured to generate the first parallel data; a serializer configured to serialize the first parallel data to the first serial data; a pre-emphasis circuit configured to pre-emphasize the first serial data stream based on a pre-emphasis control value to transmit the pre-emphasized serial data to the receiver via the first transmission line; a transmission error measurer configured to measure the transmission errors of a second serial data stream, the second serial data stream being generated by loop-backing the first serial data stream through the receiver; and a pre-emphasis controller configured to set the predetermined pre-emphasis control value corresponding to a minimum transmission error, to an optimum pre-emphasis control value.

In other embodiments of the present invention, there is provided an adaptive pre-emphasis method including: pre-emphasizing a first serial data stream based on a plurality of pre-emphasis control values to transmit the pre-emphasized serial data stream to a receiver via a first transmission line; loop-backing the pre-emphasized serial data stream to a transmitter via a second transmission line; measuring transmission errors of a second serial data stream loop-backed through the receiver via the second transmission line; allocating the measured transmission error to each corresponding pre-emphasis control value; and setting the pre-emphasis control value corresponding to a minimum transmission error, to an optimum pre-emphasis strength value.

In other embodiments of the present invention, there is provided an adaptive pre-emphasis method including: pre-emphasizing a first serial data stream based on a plurality of pre-emphasis control values to transmit the pre-emphasized serial data stream to a receiver via a first transmission line by a transmitter; measuring transmission errors of the first serial data stream by the receiver; transmitting the transmission errors measured by the receiver, to the transmitter via a second transmission line; allocating the measured transmission errors to each of the pre-emphasis control values by the transmitter; and setting the pre-emphasis control value corresponding to a minimum transmission error to an optimum pre-emphasis strength value by the transmitter.

BRIEF DESCRIPTION OF THE DRAWINGS

FIG. 2 is a table illustrating pre-emphasis strength values and the number of bit errors corresponding to each of the pre-emphasis strength values according to the first example embodiment of the present invention;

FIG. 8 is a table illustrating pre-emphasis strength values and eye sizes corresponding to each of the pre-emphasis strength values according to the second example embodiment of the present invention;

Figure 1:
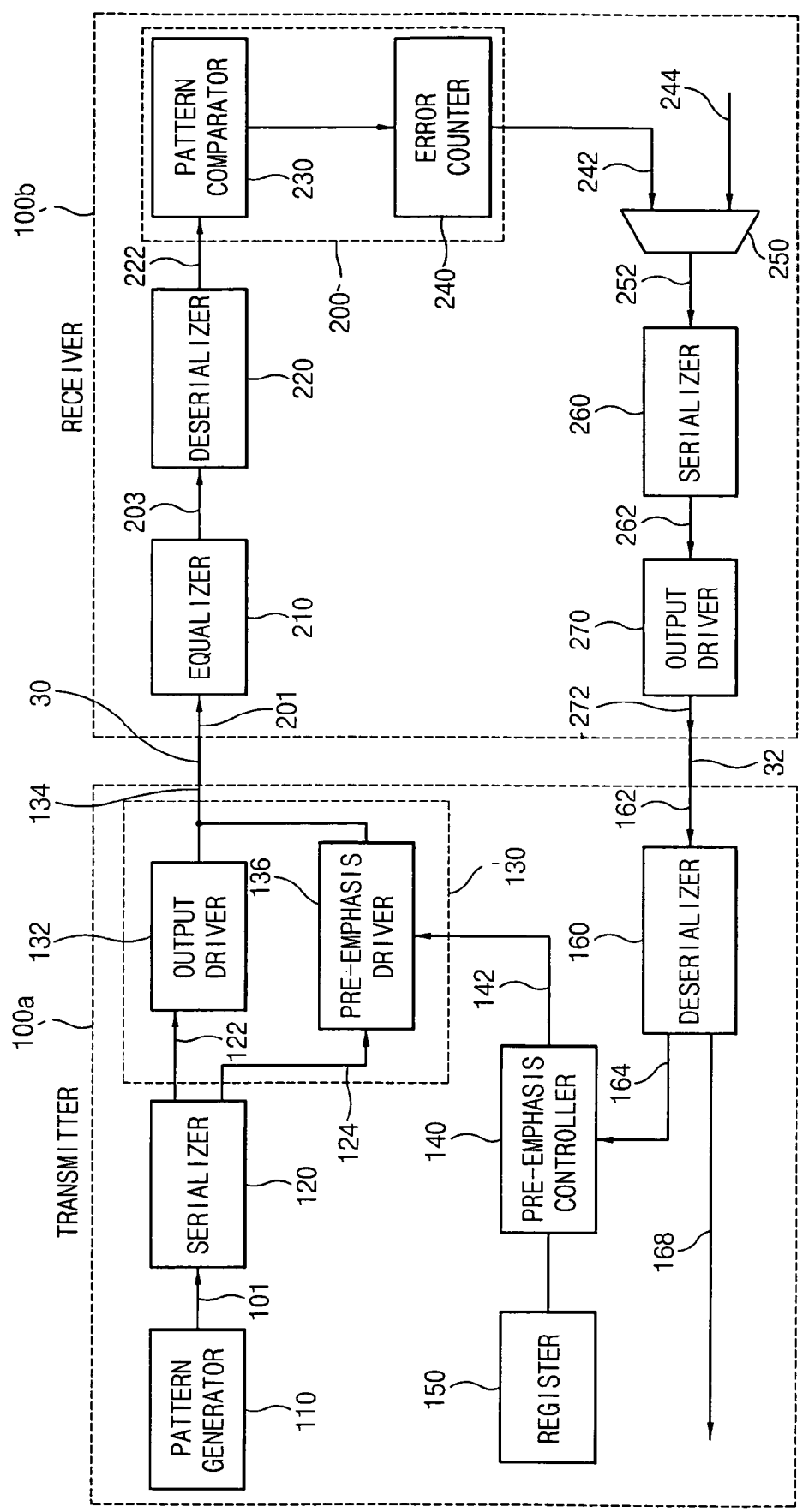
FIG. 1 is a block diagram illustrating a serial data communication system including a transmitter and a receiver according to a first example embodiment of the present invention.

DESCRIPTION OF EMBODIMENTS
ACCORDING TO THE INVENTION

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

A transmitter or a receiver in a data communication system includes a serializer/deserializer (hereinafter referred to as 'SerDes'). The SerDes serializes parallel data composed of k bits (k is a natural number greater than 2) and transmits or receives the serialized data via a transmission line.

An adaptive pre-emphasis apparatus according to example embodiments of the present invention automatically searches for an optimum pre-emphasis strength value to minimize the ISI (Inter-Symbol Interference) resulted from a predetermined characteristic of the transmission line while serial data are transmitted or received via the transmission line.

For example, when the SerDes is powered-on, the optimum pre-emphasis strength value search mode is activated. After the optimum pre-emphasis strength value is obtained, the serial data are pre-emphasized based on the obtained optimum pre-emphasis strength value and the pre-emphasized serial data are transmitted via the transmission line.

The optimum pre-emphasis strength value search mode can be activated whenever the power is on. Alternatively, the stored optimum pre-emphasis strength value can be reused at the next power-on time after the obtained optimum pre-emphasis strength value is stored in a non-volatile memory as long as the transmission line is not changed. It will be understood that the term "optimum" also includes operations of embodiments according to the invention where the transmitter/receiver operate such that the error rate is acceptable to maintain reliable operation despite that the corresponding strength value does not provide the lowest possible error level. Accordingly, the terms "optimum", "optimal", and the like include values where the pre-emphasized data is received with an acceptable error rate so that communications can be conducted sufficiently for the intended application even though other setting as may provide lower error rates.

Hereinafter, operations of the optimum pre-emphasis strength value search mode will be described below.

FIG. 1 is a block diagram illustrating a serial data communication system including a transmitter 100a and a receiver 100b according to a first example embodiment of the present invention. Referring to FIG. 1, the transmitter 100a includes a pattern generator 110, a serializer 120, a pre-emphasis circuit 130, a pre-emphasis controller 140, a register 150 and a deserializer 160. The receiver 100b includes an equalizer 210, a deserializer 220, a bit error decision unit 200, a multiplexer 250, a serializer 260 and an output driver 270.

The serializer 120 converts a parallel data stream 101 composed of k bits (k is a natural number greater than 2) provided from the pattern generator 110 into a serial data stream.

The pre-emphasis circuit 130 includes an output driver 132 and a pre-emphasis driver 136. The output driver 132 receives input signals 122 IN and INB among the serial data to differentially amplify the input signals 122, and operates with the pre-emphasis driver 136 to output pre-emphasized output signals 134 OUT and OUTB. The data bit 'INB' is an inverted signal of the data bit 'IN'.

The pre-emphasis driver 136 receives a pre-emphasis control value 142 composed of a predetermined bit value (n), pre-emphasizes delayed input signals 124 DIN and DINB. The delayed input signals 124 DIN and DINB are obtained by delaying the input signals 122 IN and INB based on the pre-emphasis strength value (n). For example, the pre-emphasis control value is composed of a predetermined number of bits. The pre-emphasis control value may be a pre-emphasis strength value. The 'DIN' signal is a delayed signal of the 'IN' signal—for example, the 'IN' signal is delayed by 1 U.I. (Unit Interval; refer to FIG. 4), and the 'DINB' is an inverted signal of the 'DIN' signal.

The pre-emphasis controller 140 decodes transmission error data received from the receiver 100b, for example, the serializer/deserializer (SerDes), and allocates (or maps) the decoded transmission error data to corresponding pre-emphasis strength value. The transmission error data includes, for example, the number of bit errors, a jitter value or an eye size. The example embodiments of the present invention will discuss a case where the transmission error data include the number of bit errors. Each of the numbers of bit errors allocated (or mapped) to the corresponding pre-emphasis strength value (n) is stored in the register 150 (refer to FIG. 2).

As used herein, the term "data eye" refers to time and voltage ranges over which transmitted data may be valid at a receiver within a cycle. In particular, the limited-bandwidth nature of some serial transmission channel can result in distortion and "closure" of the data eye in both the time and voltage domains, at high data transmission rates. Serial communication in integrated circuits, such as application specific integrated circuits (ASICs), can use clock synchronization and for recovery of serial data streams from transmission channels to measure the "data eye". Clock signals and data can be recovered by detecting transitions in the serial data stream and the valid data between those transitions. In order to reduce or minimize error in the received data, the serial data stream may be sampled near the center of this eye. Accordingly, the larger the data eye, the more reliable the sampling of data may become.

FIG. 2 is a table illustrating pre-emphasis strength values and the number of bit errors corresponding to each of the pre-emphasis strength values according to the first example embodiment of the present invention.

The pre-emphasis controller 140 sets the pre-emphasis strength value (n) corresponding to the minimum number of bit errors, to an optimum pre-emphasis strength value. For example, as shown in FIG. 2, in a case where the pre-emphasis circuit 130, included in the transmitter 100a, pre-emphasizes data signals based on the pre-emphasis strength value (n) of 0.1, and transmits the pre-emphasized data signals to the receiver 100b via a transmission line 30, the number of bit errors of the transmitted pre-emphasized data signals that are measured in the receiver 100b, is 100.

Referring to FIG. 2, the number of bit errors of the transmitted data signals that is measured in the receiver has a minimum value 0 when the pre-emphasis circuit 130 included in the transmitter 100a pre-emphasizes the data signals based on the pre-emphasis strength value (n) of 0.4.

When the pre-emphasis circuit 130 pre-emphasizes the data signals based on the optimum pre-emphasis strength value (for example, when the pre-emphasis strength value (n) is 0.4), and transmits the pre-emphasized data signals to the receiver 100b, the number of bit errors of the received data signal measured in the receiver 100b may be minimized.

The deserializer 160 included in the transmitter 100a deserializes serialized data which include the number of bit errors or data 162 received from the receiver 100b via a transmission line 32. The deserializer 160 provides the deserialized bit error number data 164 to the pre-emphasis controller 140, and provides the deserialized data 168, which correspond to data 244 of the receiver 100b, to another processing block (not shown).

The receiver 100b measures the number of bit errors of the serial data received through the transmission line 30 to transmit the measured bit error number to the transmitter 100a via the transmission line 32.

In detail, the equalizer 210 compensates for distortion of a data signal 201 due to the ISI (Inter-Symbol Interference) occurring while the data signal 201 is transmitted to the equalizer 210 of the receiver 100b via the transmission line 30. That is, the equalizer 210 compensates for a magnitude and a delay characteristic of the data signal 201. For example, the equalizer 210 maybe an adaptive DFE (Decision Feedback Equalizer) that continuously updates the tap coefficient of the equalizer so that the tap coefficient may be suitable for transmission channel characteristics.

The deserializer 220 de-serializes an output signal 203 of the equalizer 210 to output the deserialized output signal 222.

The bit error decision unit 200 includes a pattern comparator 230 and an error counter 240. The pattern comparator 230 compares the deserialized output data 222 with a prepared test pattern by employing a BIST (Built-In Self Test) manner, and then determines whether bit errors occur in the deserialized output data 222 or not. The prepared test pattern in the receiver 100b may be identical with a data pattern generated from the pattern generator 110 of the transmitter 100a.

The error counter 240 counts the number of the bit errors of the signals outputted from the pattern comparator 230. That is, the error counter 240 counts the number of bit errors of received data that are pre-emphasized based on a particular pre-emphasis value and then are transmitted to the receiver 100b via the transmission line 30.

The multiplexer 250 selects either data 244 of the receiver 100b or the bit error numbers of the data outputted from the error counter 240 in response to a predetermined selection signal that depend on operation modes, and then provides the selected data 252 to the serializer 260. The operation modes are composed of the optimum pre-emphasis strength value search mode and data transmission mode.

For example, the multiplexer 250 provides the data 242 including the number of bit errors outputted from the error counter 240 to the serializer 260 during the optimum pre-emphasis strength value search mode, and provides the data 244 of the receiver 100b to the serializer 260 during the data transmission mode. For example, the data 244 may include data provided from a hard disk drive (HDD).

The serializer 260 serializes either the data including 242 the number of bit errors or the data 244, and the output driver 270 amplifies an output 262 of the serializer 260 to transmit the amplified output data to the transmitter 100a via the transmission line 32.

Alternatively, the receiver 100b may include another pre-emphasis driver (not shown), and the data 242 including the number of bit errors 242 or the data 244 are pre-emphasized based on a pre-emphasis strength value to be transmitted to the transmitter 100a via the transmission line 32.

Figure 3:
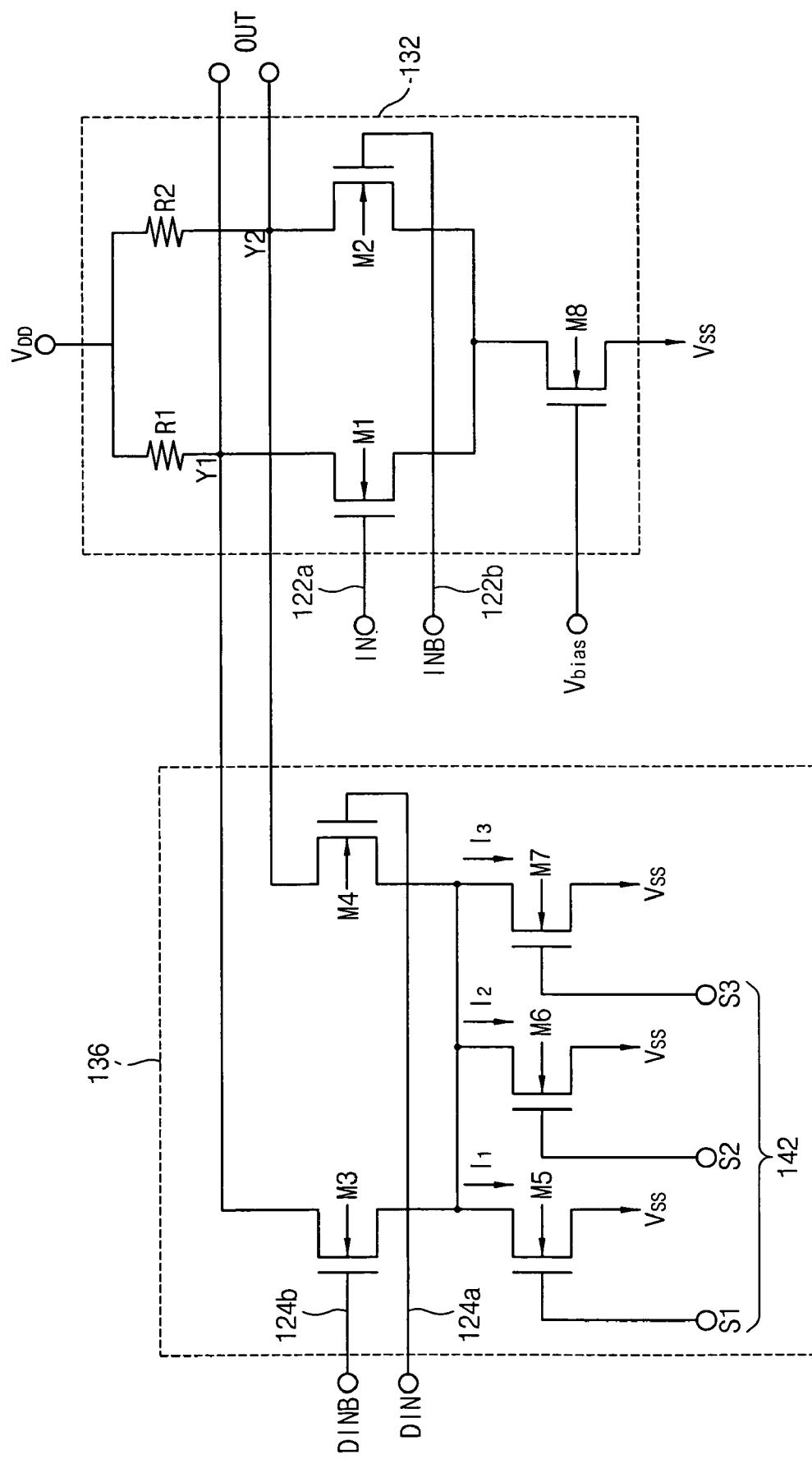
FIG. 3 is a circuit diagram illustrating an example of an output driver and a pre-emphasis driver included in the transmitter shown in FIG. 1.
Figure 4:
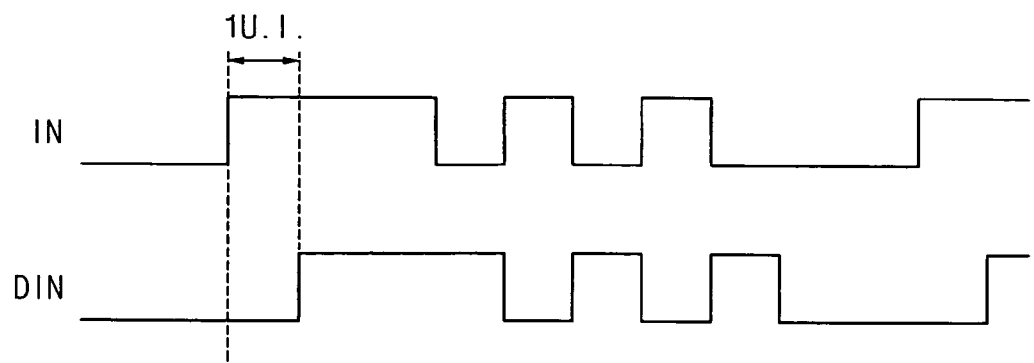
FIG. 4 is a timing diagram illustrating input signals provided to both the output driver and the pre-emphasis driver shown in FIG. 3.

FIG. 3 is a circuit diagram illustrating an output driver 132 and a pre-emphasis driver 136 included in the transmitter 100a shown in FIG. 1 according to an example embodiment of the present invention, and FIG. 4 is a timing diagram illustrating input signals IN and DIN provided to both the output driver 132 and the pre-emphasis driver 136 shown in FIG. 3.

Referring to FIGS. 3 and 4, the output driver 132 includes registers R1 and R2, and transistors M1, M2 and M8. The pre-emphasis driver 136 includes transistors M3, M4, M5, M6 and M7.

A gate electrode of the transistor M8 included in the output driver 132 is coupled to a bias voltage Vbias and operates as a static current source. The bias voltage Vbias determines a magnitude of a static current of the transistor M8.

The output driver 132 differentially amplifies serialized input data IN 122a and INB 122b received through each of the gate electrodes of the transistors M1 and M2, respectively.

Each of the gate electrodes of the transistors M5, M6 and M7 receives a pre-emphasis strength value (n) composed of predetermined bits, and each of the magnitudes of static currents flowing through the transistors M5, M6 and M7 may be controlled based on the pre-emphasis strength value (n).

For example, the pre-emphasis strength value (n) is composed of three bits S1, S2 and S3; however, the pre-emphasis strength value (n) is not limited to the three bits and may be composed of 2, 4, or 5 bits and so on.

The pre-emphasis driver 136 differentially amplifies DIN 124a and DINB 124b received from the serializer 120 based on the pre-emphasis strength value (n) composed of the three bits S1, S2 and S3.

Hereinafter, operations of the output driver 132 and the pre-emphasis driver 136 will be described with reference to FIGS. 3, 4 and 5.

Figure 5:
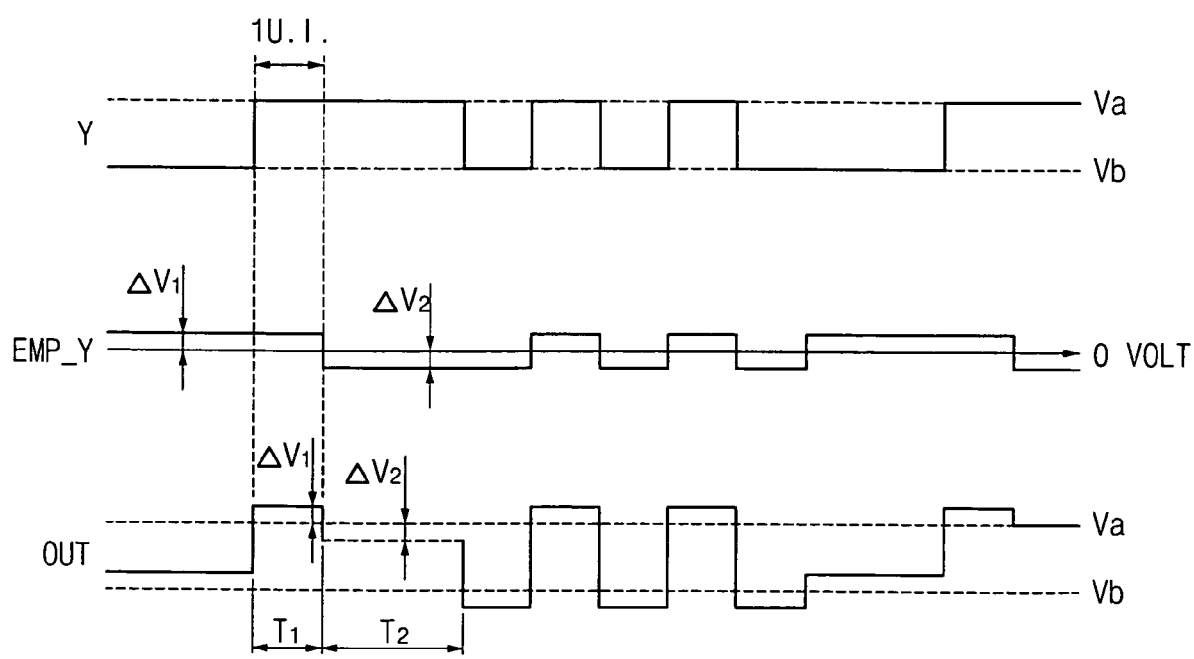
FIG. 5 is a timing diagram illustrating output signals outputted from both the output driver and the pre-emphasis driver shown in FIG. 3.

FIG. 5 is a timing diagram illustrating output signals Y, EMP_Y and OUT outputted from both the output driver 132 and the pre-emphasis driver 136 shown in FIG. 3.

In detail, when the pre-emphasis driver 136 is inactivated and the output driver 132 is activated, the pre-emphasis circuit 130 outputs the output signal Y. When the pre-emphasis driver 136 is activated and the output driver 132 is inactivated, the pre-emphasis circuit 130 outputs the output signal EMP_Y.

In a case where the pre-emphasis driver 136 is inactivated and the output driver 132 is activated, when the input data IN 122a has a logic high level, the transistor M1 is turned on and the transistor M2 is turned off.

As a result, the resistor R1, the transistors M1 and M8 form a current path, and an output node Y1 has a logic low level by a voltage drop of the resistor R1. The other output node Y2 has a logic high level since the transistor M2 is turned off.

In contrast, when the input data IN 122a has a logic low level, the transistor M1 is turned off and the transistor M2 is turned on.

As a result, the output node Y1 has a logic high level and the other output node Y2 has a logic low level by a voltage drop of the resistor R2.

In a case where the output driver 132 is inactivated and the pre-emphasis driver 136 is activated, each of static currents I1, I2 and I3 flowing through the transistors M5, M6 and M7 is controlled based on the pre-emphasis strength value (n) composed of the three bits S1, S2 and S3 that are applied to each of the gate electrodes of the transistors M5, M6 and M7, thereby changing voltage levels of the output nodes Y1 and Y2.

For example, when the S3 is a most significant bit and the S1 is a least significant bit, a transistor size ratio of the transistors M7, M6 and M5 may be set to 4:2:1. Accordingly, each of the magnitudes of the currents I1, I2 and I3 flowing through the transistors M7, M6 and M5 is controlled substantially in proportion to each of the bit values of the S3, S2 and S1.

When a high level voltage (i.e. a bit value is '1') is applied to the gate of the transistor M5, a static current I1 flowing through a source and a drain of the transistor M5 can be defined as I; when a high level voltage is applied to the gate of the transistor M6, a static current I2 flowing through a source and a drain of the transistor M6 can be defined as 2I, and when a high level voltage is applied to the gate of the transistor M7, a static current I3 flowing through a source and a drain of the transistor M7 can be defined as 4I.

As a first example, when the input data DIN 124a having a logic high level is inputted to the pre-emphasis driver 136, the transistor M3 is turned off and the transistor M4 is turned on, and the pre-emphasis strength value (n) composed of the three bits S3, S2 and S1 has a binary value '000', low level voltages are applied to the transistors M7, M6 and M5, the transistors M7, M6 and M5 are turned off and currents don't flow through the transistors M7, M6 and M5. As a result, voltage drops by the resistors R1 and R2 don't occur, both of the output nodes Y1 and Y2 have a high level voltage and the pre-emphasis circuit 130 generates the output voltage EMP_Y having about 0 volts.

As a second example, when the pre-emphasis strength value (n) composed of the three bits S3, S2 and S1 has a binary value '001' while the transistor M3 is turned off and the transistor M4 is turned on, a high level voltage is applied to the transistor M5 and low level voltages are applied to the transistors M6 and M7; thus, a total static current flowing through the transistors M7, M6 and M5 is about I.

As a result, the output node Y2 has a low level voltage due to the voltage drop by I×R2, and the output node Y1 has a high level voltage since a current doesn't flow through the resistor R1.

That is, the output voltage EMP_Y of the pre-emphasis circuit 130 in a case where the pre-emphasis strength value (n) is '001' is smaller than that in a case where the pre-emphasis strength value (n) is '000'.

As a third example, when the pre-emphasis strength value (n) composed of the three bits S3, S2 and S1 has a binary value '011' while the transistor M3 is turned off and the transistor M4 is turned on, high level voltages are applied to the transistors M5 and M6, and a low level voltage is applied to the transistor M7; thus, a total static current flowing through the transistors M7, M6 and M5 is about (I+2I=3I). Comparing the pre-emphasis strength value (n) having the binary value '011' with that having the binary value '001', a voltage level of the output node Y1 is identical with each other; however, a voltage level of the output node Y2 decreases since a voltage drop of the pull-up resistor R2 increases.

As a result, the output voltage EMP_Y of the pre-emphasis circuit 130 in a case where the pre-emphasis strength value (n) is '011' is smaller than that in a case where the pre-emphasis strength value (n) is '001'.

As a fourth example, when the pre-emphasis strength value (n) composed of the three bits S3, S2 and S1 has a binary value '111' while the transistor M3 is turned off and the transistor M4 is turned on, high level voltages are applied to the transistors M5, M6 and M7; thus, a total static current flowing through the transistor M7, M6 and M5 is about (I+2I+4I=7I).

Comparing the pre-emphasis strength value (n) having the binary value '111' with that having the binary value '011', voltage levels of the output node Y1 are identical with each other; however, a voltage level of the output node Y2 decreases since a voltage drop of the pull-up resistor R2 increases.

As a result, the output voltage EMP_Y of the pre-emphasis circuit 130 in a case where the pre-emphasis strength value (n) is '111' is smaller than that in a case where the pre-emphasis strength value (n) is '011'.

In a case where the output driver 132 is inactivated, the output voltage EMP_Y of the pre-emphasis circuit 130 may be controlled based on each of the bit values of the pre-emphasis strength value (n).

In a case where both the output driver 132 and the pre-emphasis driver 136 are activated, the output voltage OUT of the pre-emphasis circuit 130 is equal to (Y+EMP_Y).

Referring to FIG. 5, the voltage level of the output voltage OUT of the pre-emphasis circuit 130 is equal to (Va+ΔV1) during a time period T1. The reference symbol 'Va' represents a voltage level of the output voltage Y of the output driver 132 during T1, and the reference symbol 'ΔV1' represents an increment in voltage level of the output voltage EMP_Y of the pre-emphasis driver 136.

During a time period T2, the voltage level of the output voltage OUT of the pre-emphasis circuit 130 is equal to (Va−ΔV2). The reference symbol 'ΔV2' represents a decrement in voltage level of the output voltage EMP_Y of the pre-emphasis driver 136.

The bit errors due to the Inter-Symbol Interference (ISI) of data signals transmitted through transmission channels may be minimized by providing the pre-emphasis strength value (n) (S1, S2 and S3), which minimize the number of bit errors measured in the receiver 100b, to the pre-emphasis driver 136.

Figure 6:
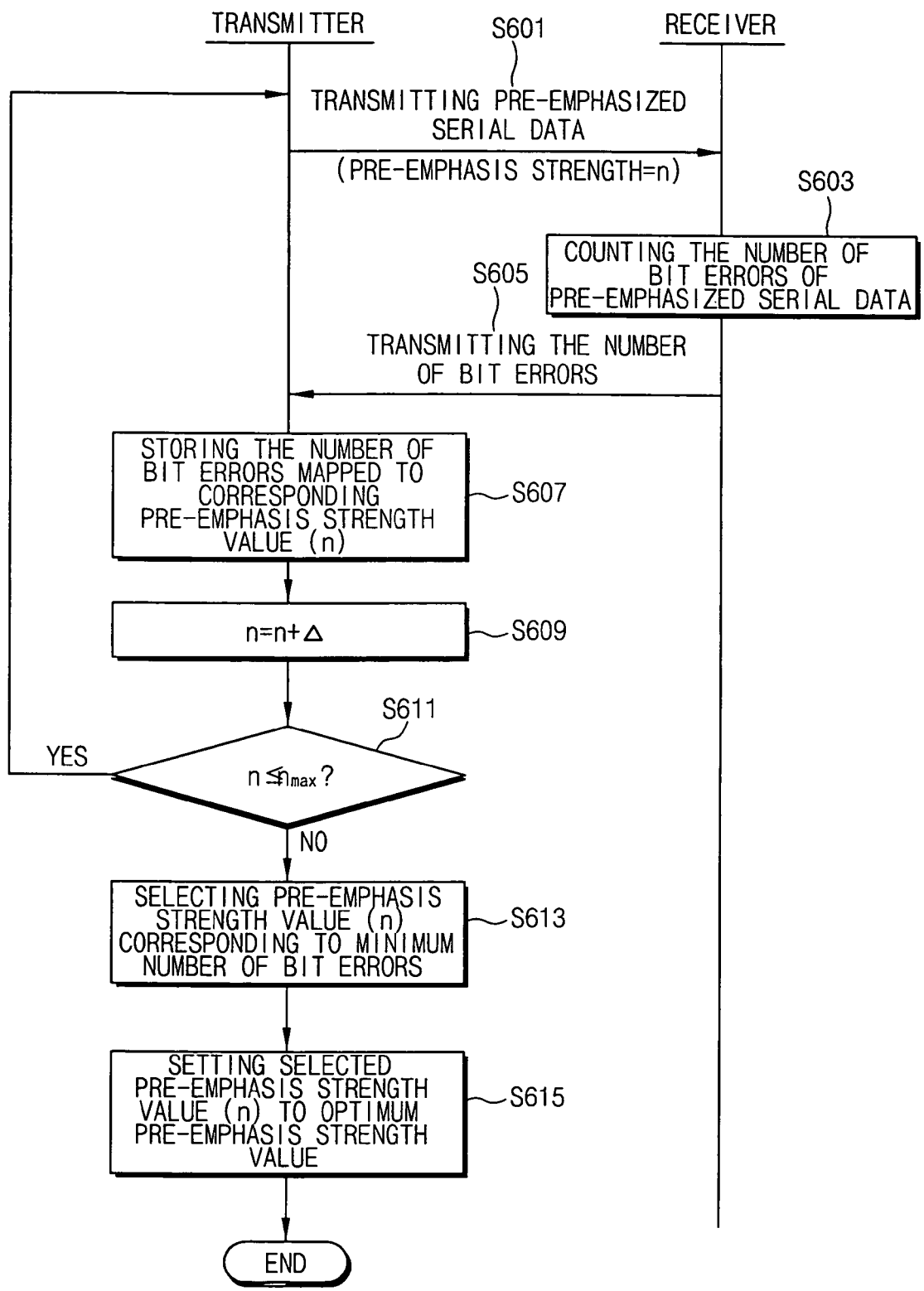
FIG. 6 is a flow chart illustrating a serial data communication method between a transmitter and a receiver according to the first example embodiment of the present invention.

FIG. 6 is a flow chart illustrating a serial data communication method between a transmitter and a receiver according to the first example embodiment of the present invention.

When the transmitter is powered-on, the optimum pre-emphasis strength value search mode is activated. When the optimum pre-emphasis strength value is searched, the optimum pre-emphasis strength value search mode is completed and serial data pre-emphasized based on the searched optimum pre-emphasis strength value are transmitted to the receiver 100b.

Referring to FIG. 6, the transmitter 100a pre-emphasizes serialized data based on a predetermined pre-emphasis strength value (n) to transmit the pre-emphasized data to the receiver 100b through the transmission line 30 (step S601).

The receiver 100b counts the number of bit errors of the pre-emphasized data received from the transmitter 100a through the transmission line 30 (step S603), and then the receiver 100b transmits the number of bit errors to the transmitter 100a (step S605).

The transmitter 100a decodes the received number of the bit errors and allocates the decoded the number of the bit errors to a corresponding pre-emphasis strength value (n). The numbers of bit errors allocated (or mapped) to each of the pre-emphasis strength values (n) is stored in the register 150 (step S607). For example, the number of bit errors may be stored in a non-volatile memory device or a volatile memory device.

The transmitter 100a increases the pre-emphasis strength value (n) by a predetermined increment (Δ) (step S609), and determines whether the pre-emphasis strength value (n) is less than or equal to a predetermined maximum value ($n_{max}$) or not (step S611). The delta (Δ) may be an increment or may be a decrement, for example, the delta (Δ) is +0.1 as shown in FIG. 2.

When the pre-emphasis strength value (n) is less than or equal to the predetermined maximum value ($n_{max}$), the process flow goes back to the step S601 and the number of bit errors corresponding to each of the pre-emphasis strength values (n) is measured repeatedly until the condition of the step S611 is no longer satisfied.

When the pre-emphasis strength value (n) is greater than the predetermined maximum value ($n_{max}$), the transmitter 100a refers to the register 150 where the number of bit errors corresponding to each of the pre-emphasis strength values (n) is stored, and selects the pre-emphasis strength value (n) corresponding to the minimum number of bit errors (step S613).

The transmitter 100a sets the pre-emphasis strength value (n) corresponding to the minimum number of bit errors to the optimum pre-emphasis strength value, and pre-emphasizes serial data based on the optimum pre-emphasis strength value to transmit the pre-emphasized serial data to the receiver 100b via the transmission line 30 (step S615). When the optimum pre-emphasis strength value is found, the transmitter 100a terminates the optimum pre-emphasis strength value search mode and transmits the pre-emphasized serial data to the receiver 100b.

Figure 7:
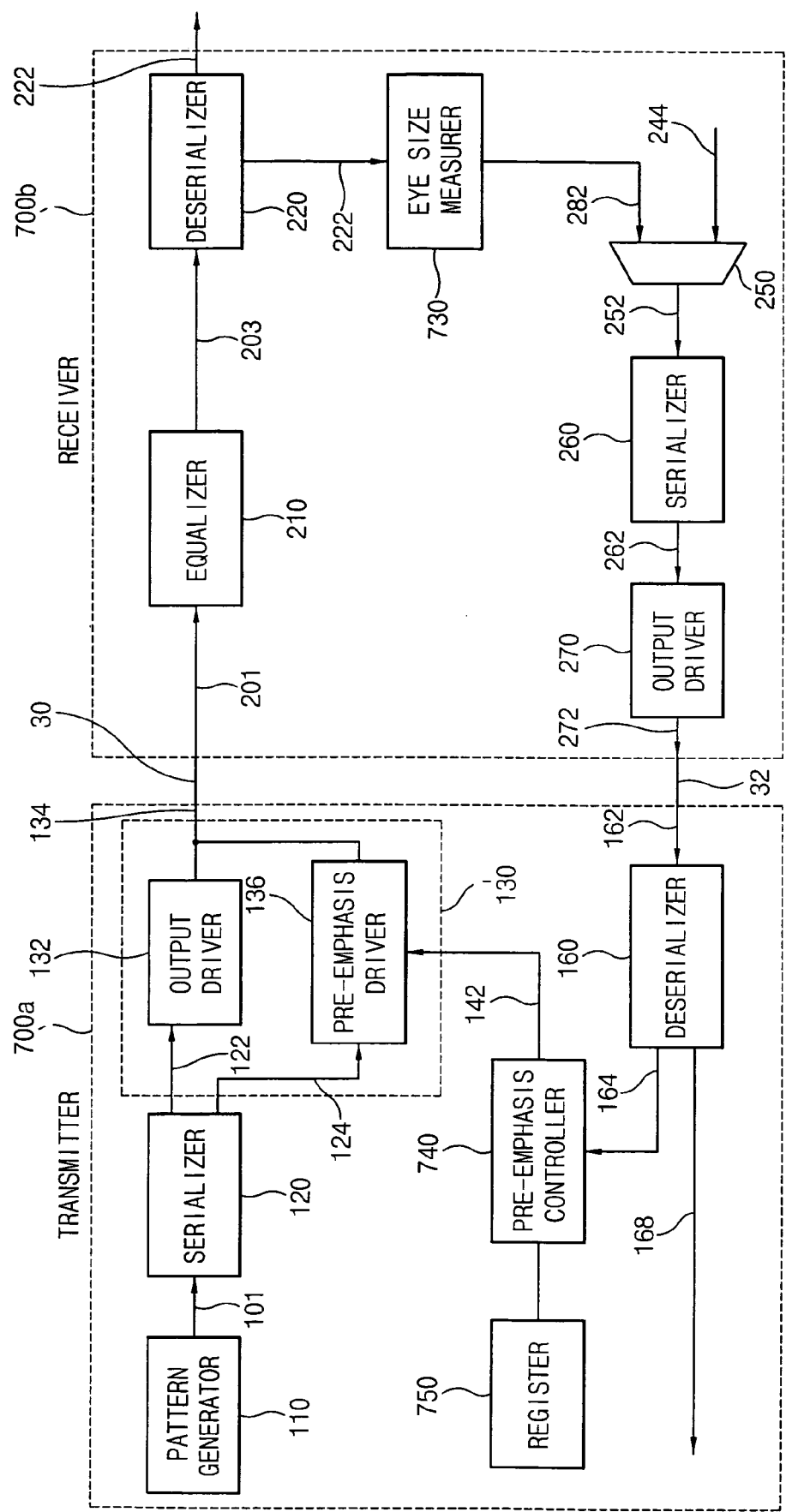
FIG. 7 is a block diagram illustrating a serial data communication system including a transmitter and a receiver according to a second example embodiment of the present invention.

FIG. 7 is a block diagram illustrating a serial data communication system including a transmitter and a receiver according to a second example embodiment of the present invention.

Referring to FIG. 7, the transmitter 700a includes a pattern generator 110, a serializer 120, a pre-emphasis circuit 130, a pre-emphasis controller 740, a register 750 and a deserializer 160. The receiver 700b includes an equalizer 210, a deserializer 220, an eye size measurer 730, a multiplexer 250, a serializer 260 and an output driver 270.

The pattern generator 110 generates parallel data stream 101 composed of k bits. The serializer 120 converts the a parallel data stream 101, composed of k bits received from the pattern generator 110, into a serial data stream and outputs data bits IN, INB, DIN and DINB.

The data bit 'INB' is an inverted signal of the data bit 'IN', and the data bit 'DIN' is a delayed signal of the data bit 'IN'—for example, the data bit 'IN' is delayed by 1 U.I. (Unit Interval).

The pre-emphasis circuit 130 includes an output driver 132 and a pre-emphasis driver 136. The output driver 132 receives input signals IN and INB 122 among the serial data to differentially amplify the input signals IN and INB 122, and operates with the pre-emphasis driver 136 to output a pre-emphasized output signal OUT 134. The pre-emphasis driver 136 receives the pre-emphasis strength value (n) composed of predetermined bits and pre-emphasizes the input signal DIN and DINB 122 based on the pre-emphasis strength value (n).

The pre-emphasis controller 740 decodes eye size data received from the receiver 700b and allocates (or maps) the decoded eye size data to a corresponding pre-emphasis strength value (n). The eye size data allocated (or mapped) to each of the pre-emphasis strength values (n) are stored in the register 750 (refer to FIG. 8).

The pre-emphasis controller 740 sets the pre-emphasis strength value (n) corresponding to a maximum eye size to the optimum pre-emphasis strength value. As shown in FIG. 8, when the pre-emphasis circuit 130 included in the transmitter 700a pre-emphasizes serial data based on the pre-emphasis strength value of 0.1, and then the pre-emphasized serial data are transmitted to the receiver 700b via the transmission line 30, the eye size of the transmitted serial data measured in the receiver 700b is 0.1.

Accordingly as the pre-emphasis circuit 130 pre-emphasizes the serial data based on the optimum pre-emphasis strength value to transmit the pre-emphasized serial data to the receiver 700b, the receiver 700b may receive the pre-emphasized serial data having maximized eye size from the transmitter 700a.

Referring to FIG. 8, there is a mapping table composed of a plurality of pairs of pre-emphasis strength values (n) and eye sizes. When the pre-emphasis strength value (n) is 0.3, the eye size of the transmitted data signal measured in the receiver 700b has a maximum size of 0.4.

The deserializer 160 deserializes the eye size data received from the receiver 700b via the transmission line 32. The deserializer 160 provides the deserialized eye size data to the pre-emphasis controller 740, and provides the deserialized data 168 (corresponding to the data 244 of the receiver 700b) to another processing block (not shown).

The receiver 700b measures the eye size of the pre-emphasized serial data 201 received through the transmission line 30, and transmits the measured eye size data to the transmitter 700a.

The equalizer 210 compensates for distortion of the pre-emphasized serial data signal 201 due to the ISI (Inter-Symbol Interference) occurring while the serial data 201 are transmitted to the equalizer 210 via the transmission line 30.

The deserializer 220 deserializes an output signal 203 of the equalizer 210 to provide the deserialized output signal 222 to the eye size measurer 730 and another data processing block (not shown).

The eye size measurer 730 measures the eye size of the deserialized data signal 222. For example, the eye size measurer 730 includes a clock data recovery circuit (CDR; not shown) and a comparator (not shown).

Particularly, the CDR extracts clock used in the transmitter 700a from the output data 222 of the deserializer 220, and re-times the output data 222 of the deserializer 220 based on the extracted clock.

The comparator (not shown) shifts the extracted clock with respect to the output data 222 of the deserializer 220 by a predetermined time interval and then measures the eye size at the time point synchronized with the shifted clock. At a specific time points of the predetermined time interval, the output data 222 are checked whether the signal level and the phase of the output data 222 are varied or not.

During the clock shifting process, the output data 222 are determined to have a bit error where jitter occurs at a specific point of the output data since the signal level and the phase of the output data 222 are varied where jitter occurs at the specific point of the output data. Conversely, during the clock shifting process, the output data 222 are determined not to have a bit error where jitter doesn't occur at a specific point of the output data since the signal level and the phase of the output data 222 aren't varied where jitter doesn't occur at the specific point of the output data.

The measured eye size 282 passes through the multiplexer 250, the serializer 260 and the output driver 270 and is transferred to the transmitter 700a via the transmission line 32.

The multiplexer 250 selects either the data 244 of the receiver 700b or the measured eye size data based on a predetermined selection signal of the operation modes, and provides the selected data to the serializer 260. For example, the multiplexer 250 provides the measured eye size data to the serializer 260 during the optimum pre-emphasis strength value search mode, and provides the data 244 of the receiver 700b to the serializer 260 during the data transmission mode.

The serializer 260 serializes either the measured eye size data or the data 244 of the receiver 700b, and the output driver 270 amplifies the serialized data outputted from the serializer 260 to provide the amplified data to the transmitter 700a via the transmission line 32.

In alternative embodiments, the receiver 700b may measure a jitter value of the data signal 201 received through the transmission line 30 instead of measuring the eye size of the data signal 201. Consequently, when the jitter value measured in the receiver 700b is a minimum value, the transmitter 700a determines the optimum pre-emphasis strength value based on the minimum jitter value.

Figure 9:
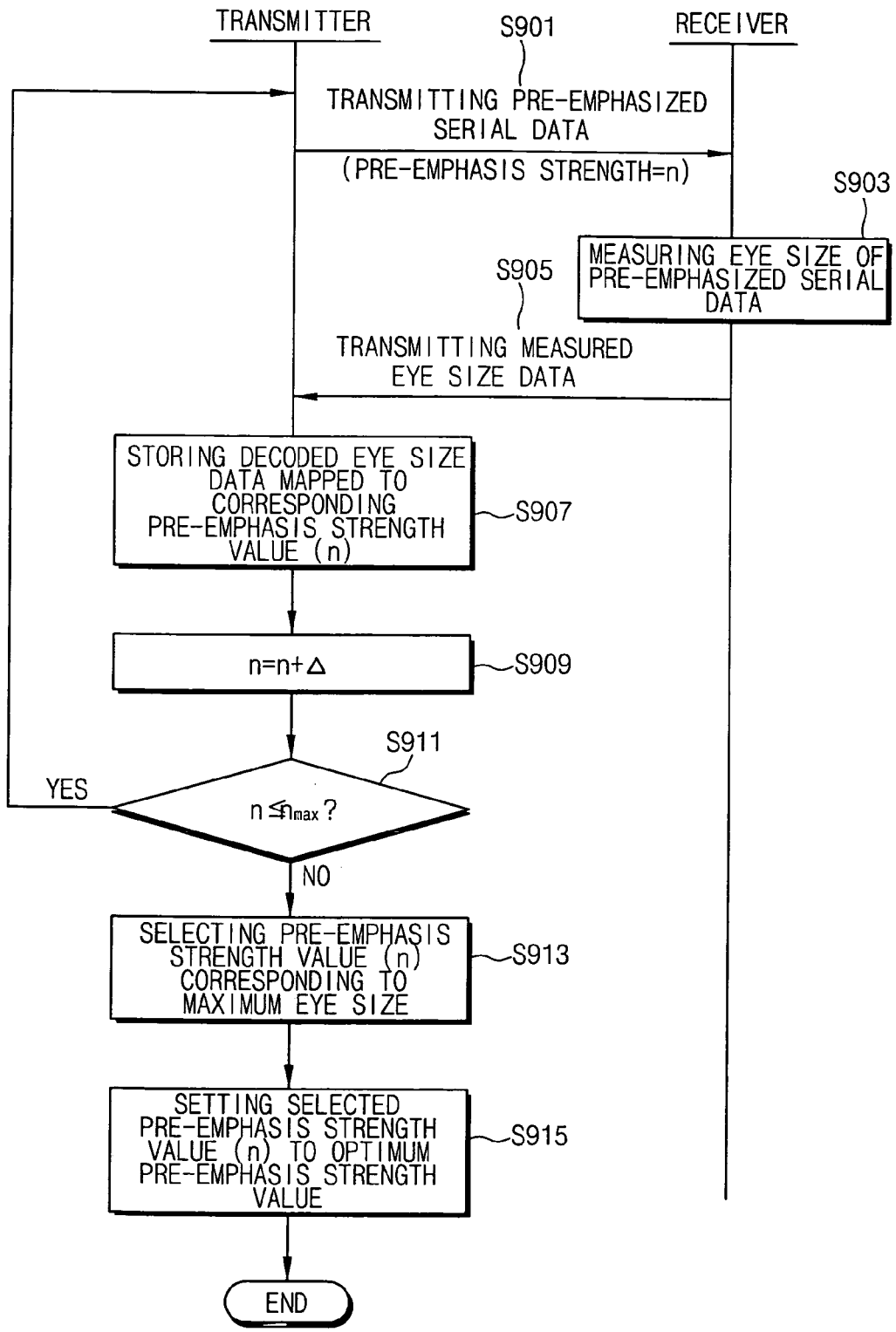
FIG. 9 is a flow chart illustrating a serial data communication method between a transmitter and a receiver according to the second example embodiment of the present invention.

FIG. 9 is a flow chart illustrating a serial data communication method between a transmitter 700a and a receiver 700b according to the second example embodiment of the present invention.

Referring to FIG. 9, during the optimum pre-emphasis strength value search mode, the transmitter 700a pre-emphasizes serialized data based on a predetermined pre-emphasis strength value (n) to transmit the pre-emphasized data to the receiver 700b through the transmission line 30 (step S901).

The receiver 700b measures the eye size of the pre-emphasized data received from the transmitter 700a through the transmission line 30 (step S903), and then the receiver 700b transmits the measured eye size data to the transmitter 700a via the transmission line 32 (step S905).

The transmitter 700a decodes the received the eye size data and allocates (or maps) the decoded eye size data to corresponding pre-emphasis strength values (n) (step S907). The eye size data allocated (or mapped) to each of the pre-emphasis strength values (n) may be stored in the register 750.

The transmitter 700a increases the pre-emphasis strength value (n) by a predetermined increment ($\Delta$) (step S909), and determines whether the pre-emphasis strength value (n) is less than or equal to a predetermined maximum value ($n_{max}$) or not (step S911). The delta ($\Delta$) may be an increment or may be a decrement, for example, the delta ($\Delta$) is +0.1 as shown in FIG. 8.

When the pre-emphasis strength value (n) is less than or equal to the predetermined maximum value ($n_{max}$), the process flow goes back to the step S901 and the eye size corresponding to each of the pre-emphasis strength values (n) is measured repeatedly until the condition of the step S911 is no longer satisfied.

When the pre-emphasis strength value (n) is greater than the predetermined maximum value ($n_{max}$), the transmitter 700a refers to the register 750 where the eye size data corresponding to each of the pre-emphasis strength values (n) are stored, and selects the pre-emphasis strength value (n) corresponding to the maximum eye size (step S913).

The transmitter 700a sets the pre-emphasis strength value (n) corresponding to the maximum eye size, to the optimum pre-emphasis strength value, and pre-emphasizes serial data based on the optimum pre-emphasis strength value, to transmit the pre-emphasized serial data to the receiver 700b via the transmission line 32 (step S915).

When the optimum pre-emphasis strength value is searched, the transmitter 700a terminates the optimum pre-emphasis strength value search mode and transmits the pre-emphasized serial data to the receiver 700b via the transmission line 32.

Figure 10:
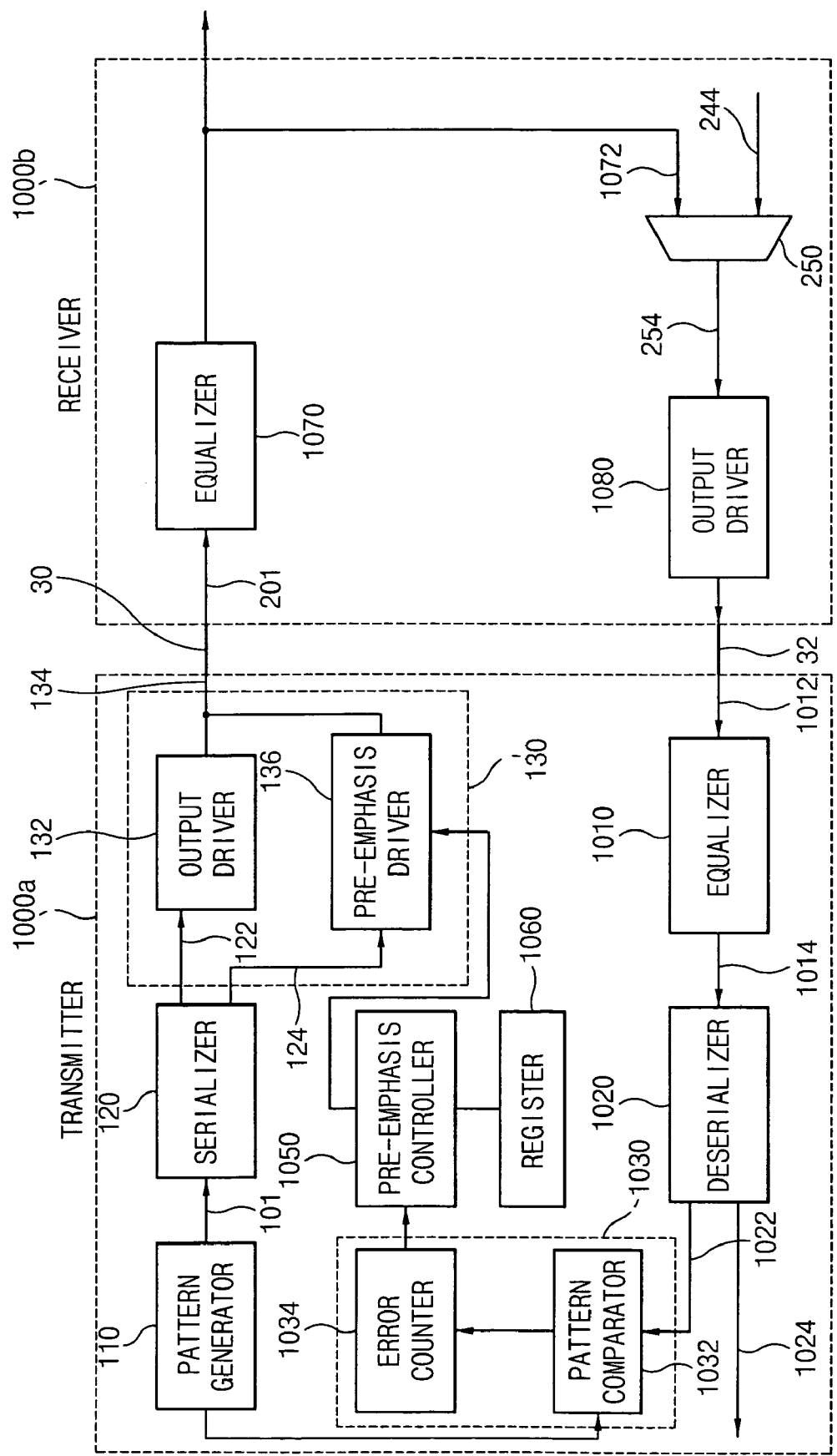
FIG. 10 is a block diagram illustrating a serial data communication system including a transmitter and a receiver according to a third example embodiment of the present invention.

FIG. 10 is a block diagram illustrating a serial data communication system including a transmitter 100a and a receiver 1000b according to a third example embodiment of the present invention.

Referring to FIG. 10, the transmitter 1000a includes a pattern generator 110, a serializer 120, a pre-emphasis circuit 130, a pre-emphasis controller 1050, a register 1060, a bit error decision unit 1030, a deserializer 1020 and an equalizer 1010.

The receiver 1000b includes an equalizer 1070, a multiplexer 250 and an output driver 1080.

The serializer 120 converts the parallel data stream 101 composed of k bits (k is a natural number greater than 2) received from the pattern generator 110 into a serial data stream.

The pre-emphasis circuit 130 includes an output driver 132 and a pre-emphasis driver 136.

The output driver 132 receives input signals IN and INB 122 among the serial data to differentially amplify the input signals IN and INB 122, and then outputs the pre-emphasized output signal OUT 134 with the pre-emphasis driver 136. The data bit 'INB' is an inverted signal of the data bit 'IN'.

The pre-emphasis driver 136 receives the pre-emphasis strength value (n) composed of predetermined bits and pre-emphasizes the input signal DIN and DINB 122 based on the pre-emphasis strength value (n).

The data bit 'DIN' is a delayed signal of the data bit 'IN'—for example, the data bit 'IN' is delayed by 1 U.I. (Unit Interval), and the 'DINB' is an inverted signal of the data bit 'DIN'.

The equalizer 1010 included in the transmitter 1000a equalizes data 1012 received through a transmission line 32.

The deserializer 1020 deserializes an output signal 1014 of the equalizer 1010. The deserializer 1020 provides deserialized loop-back data 1022 (corresponding to data 1072 of the receiver 1000b) to the pre-emphasis controller 1050, and provides deserialized data 1024 (corresponding to data 244 of the receiver 1000b) to another processing block (not shown).

The bit error decision unit 1030 includes an error counter 1034 and a pattern comparator 1032. The pattern comparator 1032 compares the deserialized output data 1022 outputted from the deserializer 1020 with a prepared test pattern outputted from the pattern generator 110 by employing a BIST (Built-In Self Test) manner, and then determines whether a bit error occurs in the deserialized output data 1022 or not.

The error counter 1034 counts bit error signals outputted from the pattern comparator 1032. That is, the error counter 1034 counts the number of bit errors of the loop-back data 1022 based on a particular pre-emphasis strength value. The loop-back data 1022 are data transmitted to the receiver 1000b from the transmitter 1000a via a transmission line 30 and then are transmitted to the transmitter 1000a from the receiver 1000b via the transmission line 32.

The pre-emphasis controller 1050 allocates (or maps) the counted the number of the bit errors to a corresponding pre-emphasis strength value (n). The numbers of bit errors allocated (or mapped) to each of the pre-emphasis strength values (n) are stored in the register 1060. The pre-emphasis controller 1050 sets the pre-emphasis strength value (n) corresponding to a minimum value of the bit error number to an optimum pre-emphasis strength value.

The equalizer 1070 of the receiver 1000b equalizes the pre-emphasized serial data 201 received through the transmission line 30 and provides the equalized data to the multiplexer 250 and another signal processing block (not shown).

The multiplexer 250 selects either data 244 of the receiver 1000b or output data 1072 of the equalizer 1070 in response to a predetermined select signal based on operation modes, and then provides the selected data 254 to the output driver 1080. For example, the multiplexer 250 provides the output data 1072 of the equalizer 1070 to the output driver 1080 during the optimum pre-emphasis strength value search mode, and provides the data 244 of the receiver 1000b to the output driver 1080 during the data transmission mode.

The output driver 1080 amplifies the output data 254 of the multiplexer 250 to transmit the amplified data 1012 to the transmitter 1000a via the transmission line 32.

In alternative embodiments, the receiver 1000b may add a pre-emphasis driver (not shown) to the output driver 1080 to pre-emphasize serial data based on a predetermined pre-emphasis strength value and then transmit the pre-emphasized data to the transmitter 1000a via the transmission line 32.

The pre-emphasis circuit 130 of the transmitter 1000a pre-emphasizes serial data based on a searched optimum pre-emphasis strength value to transmit the pre-emphasized data to the receiver 1000b via the transmission line 30. As a result, the receiver 1000b may minimize the number of bit errors in the received serial data.

Figure 11:
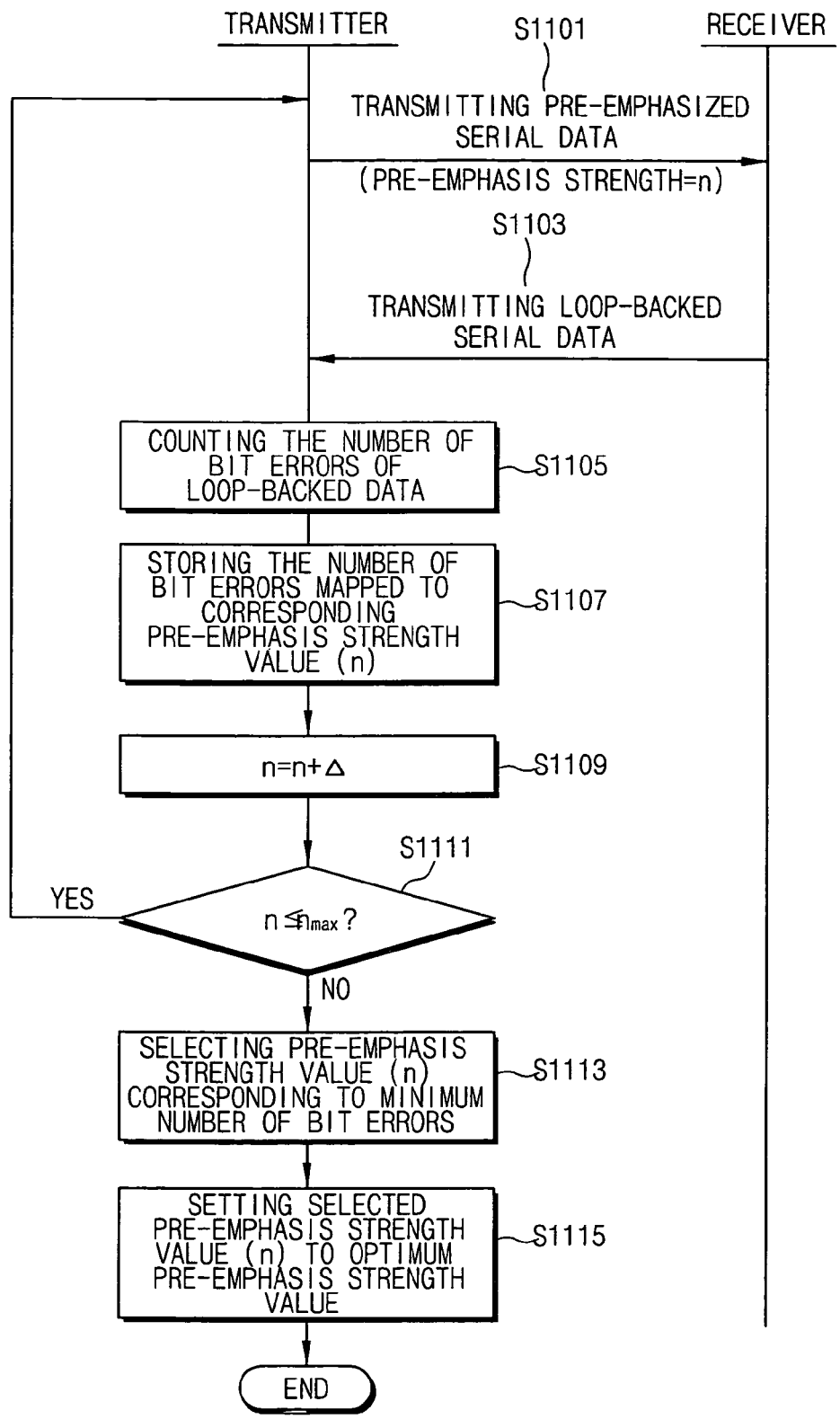
FIG. 11 is a flow chart illustrating a serial data communication method between a transmitter and a receiver according to the third example embodiment of the present invention.

FIG. 11 is a flow chart illustrating a serial data communication method between a transmitter 1000a and a receiver 1000b according to the third example embodiment of the present invention.

Referring to FIG. 11, the transmitter 1000a pre-emphasizes serialized data based on a predetermined pre-emphasis strength value (n) to transmit the pre-emphasized data to the receiver 1000b through the transmission line 30 (step S1101).

The receiver 1000b receives serial data 201 via the transmission line 30 and then the serial data 201 are loop-backed to the transmitter 1000a via the transmission line 32 (step S1103).

The transmitter 1000a counts the number of bit errors of the loop-backed data (step S1105).

The transmitter 1000a allocates (or maps) the number of the bit errors to a corresponding pre-emphasis strength value (n), and the number of the bit errors allocated (or mapped) to each of the pre-emphasis strength values (n) is stored in the register 1060 (step S1107).

The transmitter 100a increases the pre-emphasis strength value (n) by a predetermined increment ($\Delta$) (step S1109), and determines whether the pre-emphasis strength value (n) is less than or equal to a predetermined maximum value ($n_{max}$) or not (step S1111). The delta ($\Delta$) may be an increment or may be a decrement.

When the pre-emphasis strength value (n) is less than or equal to the predetermined maximum value ($n_{max}$), the process flow goes back to the step S1101 and the number of bit errors corresponding to each of the pre-emphasis strength values (n) is measured repeatedly until the condition of the step S1111 is no longer satisfied.

When the pre-emphasis strength value (n) is greater than the predetermined maximum value ($n_{max}$), the transmitter 1000a refers to the register 1060 where the number of bit errors corresponding to each of the pre-emphasis strength values (n) is stored, and selects the pre-emphasis strength value (n) corresponding to the minimum number of bit errors (step S1113).

The transmitter 1000a sets the pre-emphasis strength value (n) corresponding to the minimum number of bit errors to the optimum pre-emphasis strength value, and pre-emphasizes serial data based on the optimum pre-emphasis strength value to transmit the pre-emphasized serial data to the receiver 1000b via the transmission line 30 (step S1115). When the optimum pre-emphasis strength value is searched, the transmitter 1000a terminates the optimum pre-emphasis strength value search mode and transmits the pre-emphasized serial data to the receiver 1000b.

Figure 12:
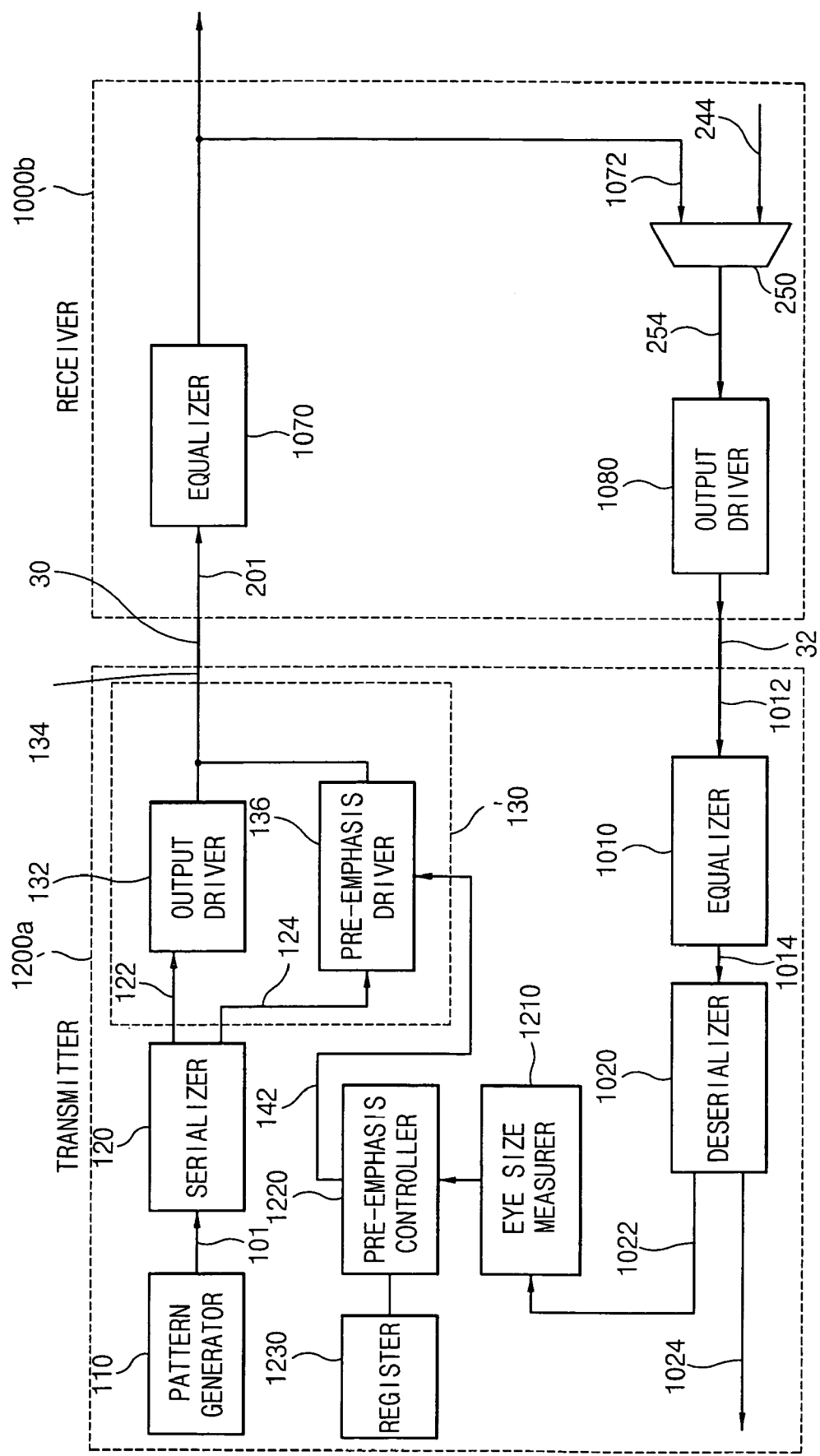
FIG. 12 is a block diagram illustrating a serial data communication system including a transmitter and a receiver according to a fourth example embodiment of the present invention.

FIG. 12 is a block diagram illustrating a serial data communication system including a transmitter 1200a and a receiver 1000b according to a fourth example embodiment of the present invention.

The receiver 1000b of FIG. 12 is identical with the receiver 1000b of FIG. 10; thus, descriptions of the receiver 1000b of FIG. 12 will be omitted.

Referring to FIG. 12, the transmitter 1200a includes a pattern generator 110, a serializer 120, a pre-emphasis circuit 130, a pre-emphasis controller 1220, a register 1230, an eye size measurer 1210, a deserializer 1020 and an equalizer 1010.

The serializer 120 converts the parallel data stream 101 composed of k bits (k is a natural number greater than 2) received from the pattern generator 110 into a serial data stream.

The pre-emphasis circuit 130 includes an output driver 132 and a pre-emphasis driver 136.

The output driver 132 receives input signals IN and INB 122 among the serial data to differentially amplify the input signals IN and INB 122 and then outputs pre-emphasized output signal OUT 134 with the pre-emphasis driver 136. The data bit 'INB' is an inverted signal of the data bit 'IN'.

The pre-emphasis driver 136 receives the pre-emphasis strength value (n) composed of predetermined bits from the pre-emphasis controller 1220 and pre-emphasizes the input signal DIN and DINB 122 based on the pre-emphasis strength value (n).

The data bit 'DIN' is a delayed signal of the data bit 'IN'— for example, the data bit 'IN' is delayed by 1 U.I. (Unit Interval), and the 'DINB' is an inverted signal of the data bit 'DIN'.

The equalizer 1010 included in the transmitter 1200a equalizes data 1012 received from the receiver 1000b via a transmission line 32. The deserializer 1020 deserializes an output signal 1014 of the equalizer 1010.

The deserializer 1020 provides deserialized loop-back data 1022 (corresponding to data 1072 of the receiver 1000b) to the eye size measurer 1210, and provides deserialized data 1024 (corresponding to data 244 of the receiver 1000b) to another processing block (not shown).

The eye size measurer 1210 measures an eye size of the deserialized loop-back data 1022 outputted from the deserializer 1020.

For example, the eye size measurer 1210 includes a clock & data recovery circuit (CDR; not shown) and a comparator (not shown).

In detail, the CDR extracts a clock data from the output data 1022 of the deserializer 1020, and re-times the output data 1022 of the deserializer 220 using the extracted clock data.

The comparator (not shown) shifts the extracted clock with respect to the output data 1022 of the deserializer 220 by a predetermined time interval and then measures the eye size.

The pre-emphasis controller 1220 allocates (or maps) the measured eye size data to a corresponding pre-emphasis strength value (n). The eye size data allocated (or mapped) to each of the pre-emphasis strength values (n) is stored in the register 1230.

The pre-emphasis controller 1220 sets the pre-emphasis strength value (n) corresponding to a maximum eye size to the optimum pre-emphasis strength value.

Accordingly as the pre-emphasis circuit 1220 pre-emphasizes serial data based on the optimum pre-emphasis strength value to transmit the pre-emphasized serial data to the receiver 1000b, the receiver 1000b may maximize the eye size of the pre-emphasized serial data received from the transmitter 1000a.

In alternative embodiments, the receiver 1000b may measure jitter value of the serial data 201 received through the transmission line 30 instead of measuring the eye size of the serial data 201. Consequently, when the jitter value measured in the receiver 1000b is a minimum value, the transmitter 1000a determines the optimum pre-emphasis strength value based on the minimum jitter value.

Figure 13:
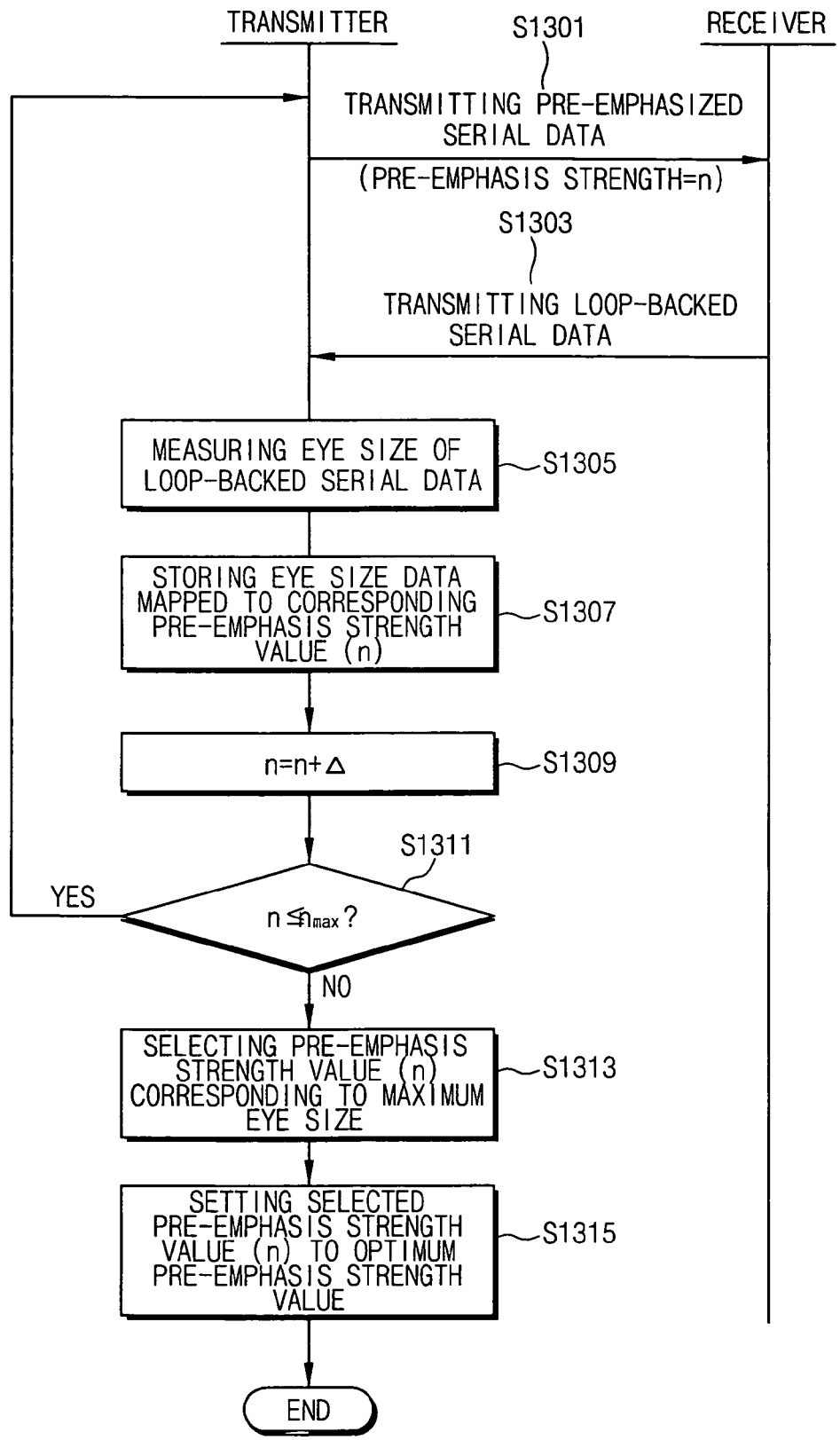
FIG. 13 is a flow chart illustrating a serial data communication method between a transmitter and a receiver according to the fourth example embodiment of the present invention.

FIG. 13 is a flow chart illustrating a serial data communication method between a transmitter 1200a and a receiver 1000b according to the fourth example embodiment of the present invention.

Referring to FIG. 13, during the optimum pre-emphasis strength value search mode, the transmitter 1200a pre-emphasizes serialized data based on a predetermined pre-emphasis strength value (n) to transmit the pre-emphasized data to the receiver 1000b through the transmission line 30 (step S1301).

The receiver 1000b receives serial data 201 via the transmission line 30 and then the serial data 201 are loop-backed to the transmitter 1200a via the transmission line 32 (step S1303).

The transmitter 1200a measures the eye size of the loop-backed data (step S1105) and then allocates (or maps) the eye size data to a corresponding pre-emphasis strength value (n), and the eye size data allocated (or mapped) to each of the pre-emphasis strength values (n) is stored in the register 1230 (step S1307).

The transmitter 1200a increases the pre-emphasis strength value (n) by a predetermined increment ($\Delta$) (step S1309), and determines whether the pre-emphasis strength value (n) is less than or equal to a predetermined maximum value ($n_{max}$) or not (step S1311). The delta ($\Delta$) may be an increment or may be a decrement.

When the pre-emphasis strength value (n) is less than or equal to the predetermined maximum value ($n_{max}$), the process flow goes back to the step S1301 and the eye size data corresponding to each of the pre-emphasis strength values (n) are measured repeatedly until the condition of the step S1311 is no longer satisfied.

When the pre-emphasis strength value (n) is greater than the predetermined maximum value ($n_{max}$), the transmitter 1200a refers to the register 1230 where the eye size data corresponding to each of the pre-emphasis strength values (n) are stored, and selects the pre-emphasis strength value (n) corresponding to the maximum eye size (step S1313).

The transmitter 1200a sets the pre-emphasis strength value (n) corresponding to the maximum eye size to the optimum pre-emphasis strength value, and pre-emphasizes serial data based on the optimum pre-emphasis strength value to transmit the pre-emphasized serial data to the receiver 1000b via the transmission line 30 (step S1315).

When the optimum pre-emphasis strength value is searched, the transmitter 1200a terminates the optimum pre-emphasis strength value search mode and transmits the pre-emphasized serial data to the receiver 1000b.

Figure 14:
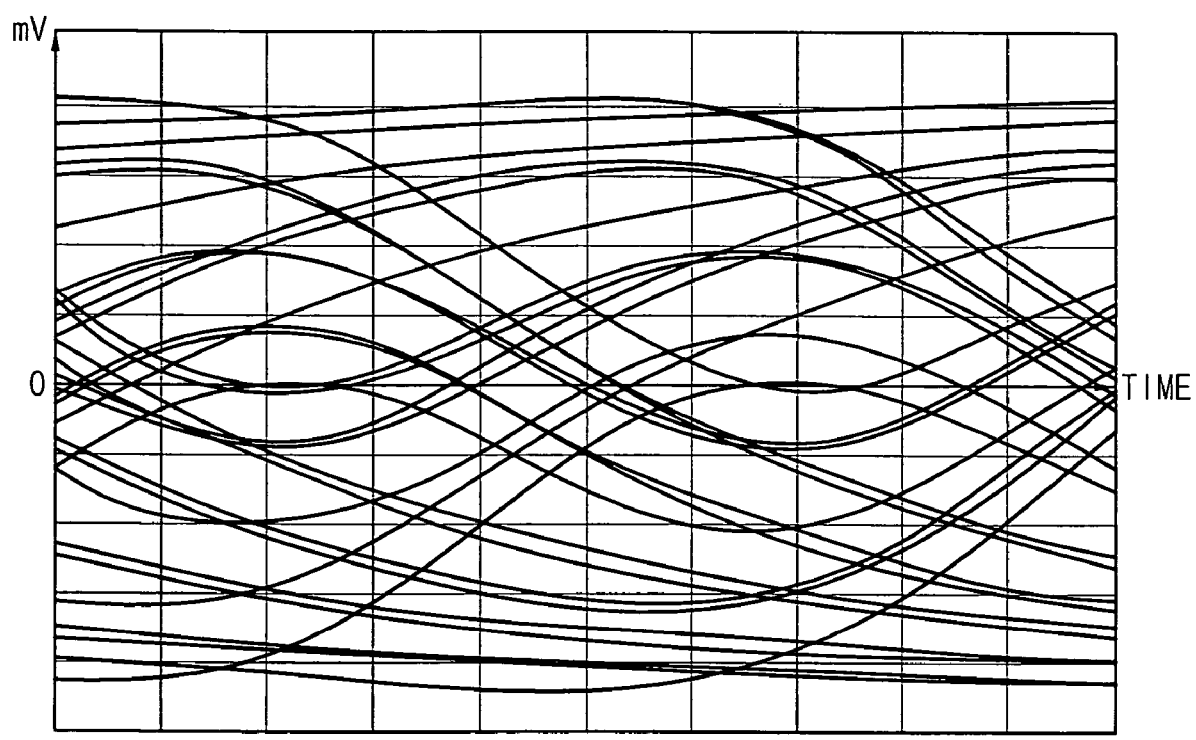
FIGS. 14 through 16 are graphs illustrating eye patterns measured during a pre-emphasis process according to an example embodiment of the present invention.
Figure 15:
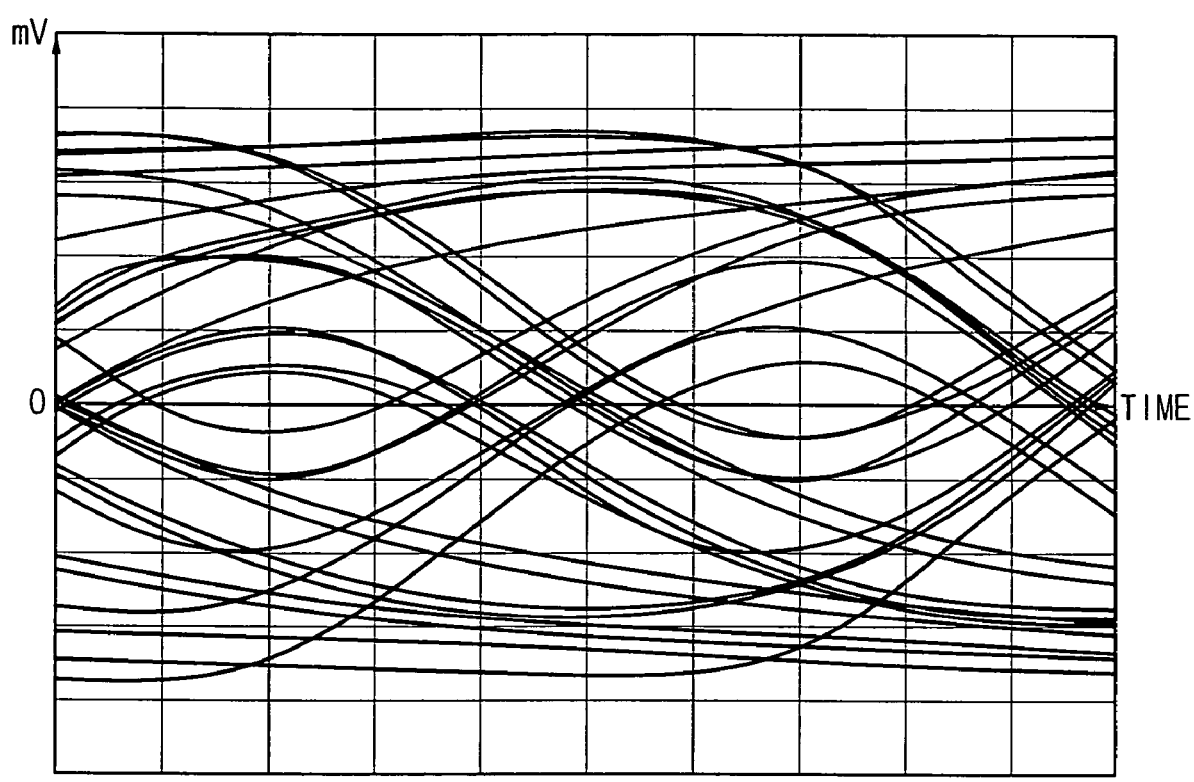
Figure 16:
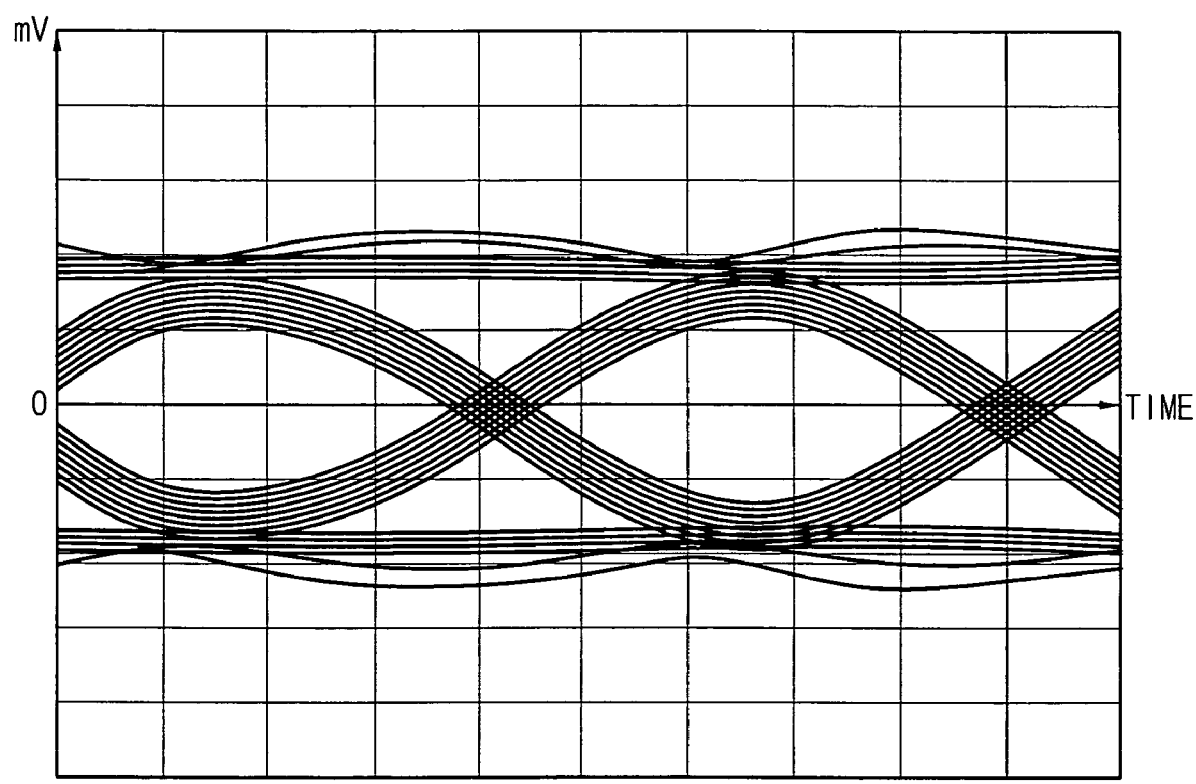

FIGS. 14 through 16 are graphs illustrating eye patterns measured by an oscilloscope during a pre-emphasis process according to an example embodiment of the present invention.

FIG. 14 shows a first measured eye pattern without using the pre-emphasis strength value according to the example embodiments of the present invention, and the first measured eye pattern has small eye sizes.

FIG. 15 shows a second measured eye pattern using the pre-emphasis strength value having about a middle value according to the example embodiments of the present invention, and the second measured eye pattern has eye sizes larger than those of the first measured eye pattern; however, the second measured eye pattern does not yet have maximized eye sizes.

FIG. 16 shows a third measured eye pattern using the optimum pre-emphasis strength value according to the example embodiments of the present invention, and the third measured eye pattern has maximum eye sizes.

As shown in FIGS. 14 through 16, when serial data pre-emphasized using the optimum pre-emphasis strength value are transmitted to the receiver via the transmission line, the serial data transmitted through the transmission line has minimized jitter.

According to the adaptive pre-emphasis apparatus, the receiver in the data communication system measures transmission errors, such as the number of bit errors, a jitter value or an eye size, of serial data received through a first transmission line, and then the transmitter determines the optimum pre-emphasis strength value based on the measured transmission errors.

Alternatively, the transmitter in the data communication system may directly measure transmission errors, such as the number of bit errors, a jitter value or an eye size, of loop-backed serial data, and then the transmitter determines the optimum pre-emphasis strength value based on the measured transmission errors.

Consequently, the adaptive pre-emphasis apparatus may minimize the Inter-Symbol Interference (ISI) of received data since the optimum pre-emphasis strength value, which is best suitable for transmission conditions such as a length of the transmission line and a transmission speed, may be automatically set.

In addition, the optimum pre-emphasis strength value may be adaptively set whenever characteristics of the transmission line are varied, without manually setting the optimum pre-emphasis strength value.

Furthermore, the adaptive pre-emphasis apparatus may minimize the Inter-Symbol Interference (ISI) since the optimum pre-emphasis strength value may be automatically set even when characteristics of the transmission line between a first transmission line connected from the transmitter to the receiver and a second transmission line connected from the receiver to the transmitter are different from each other.

While the example embodiments of the present invention and their advantages have been described in detail, it should be understood that various changes, substitutions and alterations may be made herein without departing from the scope of the invention.

What is claimed is:

1. An adaptive pre-emphasis apparatus comprising:
a pre-emphasis circuit configured to pre-emphasize a serial data stream based on a pre-emphasis control value to transmit the pre-emphasized serial data stream to a receiver via a first transmission line;
a pre-emphasis controller configured to receive measured values of transmission errors of the pre-emphasized serial data stream from the receiver via a second transmission line, and configured to set the pre-emphasis control value corresponding to a minimum measured value of the transmission errors, to an optimum pre-emphasis control value;
wherein the pre-emphasis circuit comprises an output driver configured to receive serialized first input data and second input data that are inverted data of the serialized first input data, and configured to differentially amplify the first and the second input data; and
wherein the pre-emphasis circuit further comprises a pre-emphasis driver configured to receive third input data that are delayed data of the first input data by a predetermined time period and fourth input data that are inverted data of the third input data, and configured to pre-emphasize the third and the fourth input data based on a pre-emphasis strength value to output the pre-emphasized third and fourth input data.

2. The adaptive pre-emphasis apparatus of claim 1, wherein the pre-emphasis controller maps the received measured values of the transmission errors to a corresponding pre-emphasis control value.

3. The adaptive pre-emphasis apparatus of claim 2, wherein the pre-emphasis controller decodes the measured values of the transmission errors allocated to the corresponding pre-emphasis control value, and store the decoded measured values of the transmission errors in a memory device.

4. The adaptive pre-emphasis apparatus of claim 1, wherein the pre-emphasis control value includes the pre-emphasis strength value.

5. The adaptive pre-emphasis apparatus of claim 4, wherein the pre-emphasis strength value includes a binary bit value.

6. The adaptive pre-emphasis apparatus of claim 5, wherein the pre-emphasis circuit pre-emphasizes the serial data stream based on the binary bit value of the pre-emphasis strength value to transmit the pre-emphasized serial data stream to the receiver via the first transmission line.

7. The adaptive pre-emphasis apparatus of claim 1, wherein the transmission error includes the number of bit errors.

8. The adaptive pre-emphasis apparatus of claim 1, wherein the transmission error includes an eye size.

9. The adaptive pre-emphasis apparatus of claim 8, wherein the pre-emphasis controller sets the pre-emphasis control value corresponding to a maximum eye size, to an optimum pre-emphasis control value.

10. The adaptive pre-emphasis apparatus of claim 8, wherein the pre-emphasis controller decodes the eye size to allocate the decoded eye size to a corresponding pre-emphasis control value.

11. The adaptive pre-emphasis apparatus of claim 1, wherein the transmission error includes a jitter value.

12. An adaptive pre-emphasis method comprising:
pre-emphasizing a first serial data stream based on a plurality of pre-emphasis control values to transmit the pre-emphasized serial data stream to a receiver via a first transmission line;
loop-backing the pre-emphasized serial data stream to a transmitter via a second transmission line;
measuring transmission errors of a second serial data stream loop-backed through the receiver via the second transmission line;
allocating the measured transmission error to each corresponding pre-emphasis control value; and
setting the pre-emphasis control value corresponding to a minimum transmission error, to an optimum pre-emphasis strength value, wherein pre-emphasizing the first serial data stream comprises:
receiving serialized first input data and second input data comprising inverted data of the serialized first input data, and differentially amplifying the first and the second input data; and
receiving third input data comprising delayed data of the first input data by a predetermined time period and fourth input data comprising inverted data of the third input data, and pre-emphasizing the third and the fourth input data based on a pre-emphasis strength value to output the pre-emphasized third and fourth input data.

13. The adaptive pre-emphasis method of claim 12, further comprising pre-emphasizing the second serial data stream based on the optimum pre-emphasis strength value, to provide the pre-emphasized second serial data stream via the first transmission line.

14. The adaptive pre-emphasis method of claim 12, wherein the pre-emphasis control value includes the pre-emphasis strength value.

15. The adaptive pre-emphasis method of claim 12, wherein the pre-emphasis strength value includes a binary bit value.

16. The adaptive pre-emphasis method of claim 15, wherein the step of pre-emphasizing pre-emphasizes the first serial data stream based on the binary bit value of the pre-emphasis strength value to transmit the pre-emphasized first serial data to the receiver via the first transmission line.

17. The adaptive pre-emphasis method of claim 12, wherein the transmission error includes the number of bit errors.

18. The adaptive pre-emphasis method of claim 12, wherein the transmission error includes an eye size.

19. The adaptive pre-emphasis method of claim 18, wherein the pre-emphasis control value corresponding to the eye size having a maximum value is set to an optimum pre-emphasis control value.

20. The adaptive pre-emphasis method of claim 12, wherein the transmission error includes a jitter value.

* * * * *